United States Patent
Ogawa et al.

(10) Patent No.: US 6,938,209 B2
(45) Date of Patent: Aug. 30, 2005

(54) AUDIO INFORMATION PROVISION SYSTEM

(75) Inventors: Michiko Ogawa, Osaka (JP); Ryosuke Kobayashi, Hyogo (JP); Akihisa Kawamura, Osaka (JP); Toshihiko Date, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 550 days.

(21) Appl. No.: 10/055,520

(22) Filed: Jan. 23, 2002

(65) Prior Publication Data

US 2002/0130898 A1 Sep. 19, 2002

(30) Foreign Application Priority Data

Jan. 23, 2001 (JP) ........................................ 2001-015133

(51) Int. Cl.[7] .................................................. G06F 3/00
(52) U.S. Cl. ........................ 715/727; 715/716; 715/866; 84/615
(58) Field of Search ................................. 345/716, 727, 345/728, 978; 715/727, 728, 716, 717, 978, 866; 84/615, 618, 601, 602, 609, 653; 360/30.06, 30.04, 30.08, 69

(56) References Cited

U.S. PATENT DOCUMENTS

| | | | | |
|---|---|---|---|---|
| 5,616,876 A | * | 4/1997 | Cluts | ........................ 84/609 |
| 5,726,909 A | * | 3/1998 | Krikorian | ................ 715/727 X |
| 5,969,283 A | * | 10/1999 | Looney et al. | ................ 84/609 |
| 6,201,176 B1 | * | 3/2001 | Yourlo | ........................ 84/609 |
| 6,452,609 B1 | * | 9/2002 | Katinsky et al. | ............ 345/716 |
| 6,657,116 B1 | * | 12/2003 | Gunnerson | ................... 84/615 |
| 6,731,307 B1 | * | 5/2004 | Strubbe et al. | ............. 345/727 |

FOREIGN PATENT DOCUMENTS

| | | |
|---|---|---|
| JP | 06-290574 | 10/1994 |
| JP | 10-134549 | 5/1998 |
| JP | 2000-331090 | 11/2000 |

* cited by examiner

Primary Examiner—Raymond J. Bayerl
(74) Attorney, Agent, or Firm—Snell & Wilmer L.L.P.

(57) ABSTRACT

An audio information provision system for providing a target with an audio information stream suitable to the target includes a database for storing a plurality of audio information streams; an inherent condition input section for receiving an inherent condition of the target; a variable condition input section for receiving a variable condition varying in accordance with time; a selection section for selecting at least one audio information stream from the plurality of audio information streams based on at least the inherent condition and the variable condition; and an output section for outputting the at least one audio information stream.

19 Claims, 37 Drawing Sheets

FIG.5C

- Department store
- Cafe
- Wedding reception house
- Clothing for women
- Clothing for men

FIG.6

Data and time (m/d/y): [March], [14], [2001] [2 p.m.]
Day of the week: [Saturday]
Weather: [Fine]  [Selection]
Temperature: [20] °C
Humidity: [40] %
Temperature-humidity index: [Comfortable]  [Selection]
Crowdedness: [Very crowded]  [Selection]

FIG. 12

| Space ID | Store | Quiet | Active | Luxurious | Moderate price | Traditional | Casual | Modern | Bright |
|---|---|---|---|---|---|---|---|---|---|
| 1 | High quality store A | 0.5 | -0.5 | 0.4 | -0.6 | 0.9 | -0.4 | -0.4 | 0.2 |
| 2 | High quality store B | 0.5 | -0.5 | 0.6 | -0.3 | 0.3 | -0.2 | -0.3 | 0.4 |
| 3 | High quality store C | 0 | 0 | 0.2 | -0.2 | 0.4 | -0.1 | -0.2 | 0.2 |
| 4 | High quality store D | -0.5 | 0.6 | 0.2 | 0.2 | -0.3 | 0.3 | 0.7 | 0.7 |
| 5 | Standard quality store A | -0.5 | 0.8 | 0.1 | 0.1 | -0.5 | 0.8 | 0.7 | -0.3 |
| 6 | Standard quality store B | -0.5 | 0.6 | -0.3 | 0 | -0.3 | 0.5 | 0.1 | -0.3 |
| 7 | Moderate price store A | -0.9 | 0.4 | -0.9 | 0.9 | -0.9 | 1 | 0 | -0.9 |

FIG.14

| Space ID | Store | Space image | Coordinate value (x,y) |
|---|---|---|---|
| 1 | High quality store A | Formal, classical | (−2.4, +0.9) |
| 2 | High quality store B | Conservative, gorgeous | (−1.5, +1.2) |
| 3 | High quality store C | Elegant | (−1.0, +0.5) |
| 4 | High quality store D | Modern, rich | (+1.0, +1.0) |
| 5 | Standard quality store A | Young, casual | (+1.4, +0.1) |
| 6 | Standard quality store B | Simple, natural | (+0.8, −0.5) |
| 7 | Moderate price store A | Moderate price, convenient | (+1.2, −1.5) |

FIG.15

| Day of the week (ID) | Time (ID) | | |
|---|---|---|---|
| | AM(1) | PM0~5(2) | PM5~8(3) |
| Monday through Thursday (WD) | Age group: 40s to 70s<br><br>Very few customers | Age group: 20s to 50s<br><br>Moderately crowded | Age group: 20s to 40s<br><br>Very crowded |
| Friday (WE) | Age group: 40s to 70s<br><br>Very few customers | Age group: 20s to 50s<br><br>Moderately crowded | Age group: 20s to 40s<br><br>Very crowded |
| Saturday, Sunday, holiday (HD) | Age group: 20s to 70s<br><br>Very crowded | Age group: 20s to 70s<br><br>Very crowded | Age group: 20s to 50s<br><br>Very crowded |

FIG. 17

| Season ID | Season | Special season ID | Special season |
|---|---|---|---|
| SP2 | Spring | SP2A | April 1 to April 10   Entrance ceremony |
| SU1 | Early summer | SU1A | May 5   Children's day |
| SU2 | Summer | | |
| AU1 | Autumn | AU1A | October 10   Athletics meet |
| AU2 | Late autumn | | |
| WI1 | Winter, end of the year | WI1A | December 15 to December 25   Christmas |
| | | WI1B | December 26 to December 31   End of the year |
| WI2 | Winter, beginning of the year | WI2A | January 1 to January 15   Beginning of the year |
| SP1 | Early spring | SP1A | March 3   Girls' Festival |
| | | SP1B | March 1 to March 20   Graduation ceremony |
| ALL | All the seasons | | |

FIG. 19

| Weather (ID) | Temperature (ID) | Discomfort index (ID) |
|---|---|---|
| Rain (R) | $t < 0(1)$ | Comfortable (00) |
| Cloudy (C) | $0 < t < 10(2)$ | Slightly uncomfortable (10) |
| Fine (F) | $10 < t < 20(3)$ | Uncomfortable (11) |
| Snow (S) | $20 < t < 30(4)$ | |
| | $30 < t(5)$ | |

FIG.21

| Space ID | Adjustment information for each musical genre | | | | | | | | | | |
|---|---|---|---|---|---|---|---|---|---|---|---|
| | Orchestra | Big band jazz | Classic, string music | Piano solo | Popular | Jazz | Fusion | New music, easy listening | Healing | Rock, dance, pops | Folk |
| 1 | | | 1/2 | 1/2 | 2 | 2 | | 2 | | +∞ | +∞ |
| 2 | 1/2 | 1/2 | 1/2 | 1/2 | 1/2 | 2 | 2 | 2 | | +∞ | +∞ |
| 3 | 1/2 | 1/2 | 1/2 | 1/2 | 1/2 | 1/2 | 2 | | | +∞ | +∞ |
| 4 | | | | | 1/2 | 1/2 | 1/2 | | | +∞ | +∞ |
| 5 | 2 | | +∞ | +∞ | 1/2 | 1/2 | | | +∞ | 1/2 | 1/2 |
| 6 | +∞ | | +∞ | +∞ | 1/2 | 2 | | 1/2 | +∞ | | 1/2 |
| 7 | +∞ | | +∞ | +∞ | 1/2 | 2 | | 1/2 | +∞ | | 1/2 |

FIG.22

| Space ID | Related bibliographical information | Gain information |
|---|---|---|
| 1001 Wedding reception house | Farewell, solitude, death | +∞ |
| 1005 Department store | Bitter, grudge, sorrow | +∞ |
|  | Disease, pain | +∞ |
| 1001 Wedding reception house | Bride, just married | 0 |
| 1022 Toy section | Toy, kids, babies, infants, nursery songs | 0 |

FIG. 23

| Season ID | Related bibliographical information | Adjustment information |
|---|---|---|
| SU2 | Singers associated with summer | |
| | Bands associated with summer | 0 |
| | Summer, sea, sun | |
| | Hot, fighting spirit, tropics | |
| SP1A | Girls' Festival | 0 |
| SU1A | Carp streamer | 0 |
| AU1A | Athletics meet, physical training | 0 |
| WI1, WI2 | Singers associated with winter | 1/2 |
| WI1A | Christmas | 0 |
| WI2A | Japanese music | 1/2 |
| | Early spring, new year, beginning of the year | 0 |
| WI1B | "Auld Lang Syne" | 0 |
| WI1B | "Symphony No. 9" by Beethoven | 0 |
| SP1B | Songs associated with spring | 1/2 |
| WD1, WE1 | Morning, waking | 1/2 |
| HD1 | Night, midnight | +∞ |
| WD2, WD3 | Morning, waking | +∞ |
| WE2, WE3 | ... | |
| HD2, HD3 | ... | |

FIG.26

Musical genre check list

☐ Classic
☐ Jazz
☐ Pop (Western)
☐ Pop (Japanese)
☐ Pop (Asian)
☐ Rock
☐ New age
☐ Screen music
☑ Bossa nova
. . . .

Image check list of desired music

☑ Calm
☑ Bright and happy
☐ Sentimental
☐ Moving
☐ Vigorous and high-spirited
☐ Light-footed
☐ Curious and eccentric
☑ Southern
. . . .

Desired service cost

¥ _____

Guidelines

| Cost | Duration | Number of songs |
|---|---|---|
| ¥ 200 | 5 minutes | 1~2 |
| ¥ 500 | 15 minutes | 2~4 |
| ¥ 1000 | 30 minutes | 3~6 |
| ¥ 2000 | 60 minutes | 5~15 |
| ¥ 3000 | 100 minutes | 10~20 |

— 116

Your registration data
Name: Taro MATSUSHITA
Sex: Male
Date of birth: March 3, 1991
Birthplace: Saitama Prefecture
Address: Osaka
Occupation: Office worker
Family structure: Parents, brother, sister
Music you like: classic, jazz, pop, screen music, new age, techno
Music you do not like: rock, "enka"
Musical experience: Played the trumpet in a brass band
Credit card number: 1468-3456-7334-5343

FIG.27

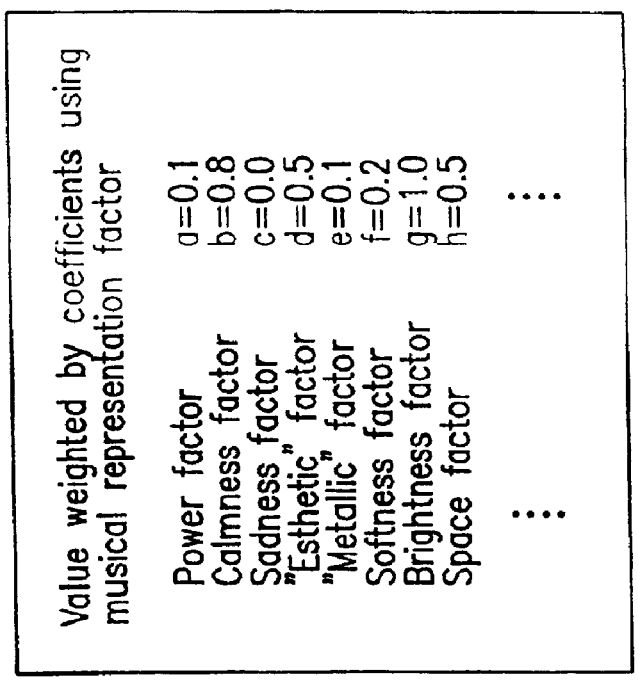

Value weighted by coefficients using musical representation factor

Power factor a=0.1
Calmness factor b=0.8
Sadness factor c=0.0
"Esthetic" factor d=0.5
"Metallic" factor e=0.1
Softness factor f=0.2
Brightness factor g=1.0
Space factor h=0.5
....

Analysis result provided by the mood information analysis section 31

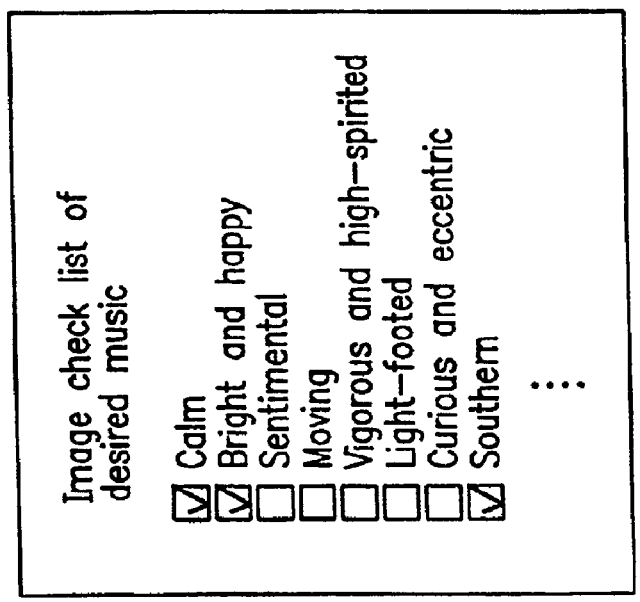

Image check list of desired music

☑ Calm
☑ Bright and happy
☐ Sentimental
☐ Moving
☐ Vigorous and high-spirited
☐ Light-footed
☐ Curious and eccentric
☑ Southern
....

Input of images of music by the user

- The following songs will satisfy your demands within your budget of 500 yen.

|   | Title | Performer | Duration |
|---|-------|-----------|----------|
| 1. | Song M | Singer S | 5'30" |
| 2. | Song Mn | Player Ss | 4'30" |
| 3. | Song MM | Singer SS | 5'00" |

- Do you want to sample them?

☑ Yes
  ☐ No

- If you do not like some of the songs after sampling them, they will be removed from the list. We will provide different songs after searching again.

|   | Title | Satisfied | Not satisfied |
|---|-------|-----------|---------------|
| 1. | Song M | ☐ | ☑ |
| 2. | Song Mn | ☑ | ☐ |
| 3. | Song MM | ☑ | ☐ |

- Tell us how strongly you feel Song M fits the following images.

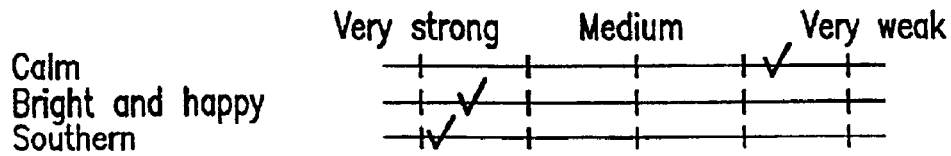

- We provided you with the following bossa nova songs the last time.

| | Title | Performer | Duration |
|---|---|---|---|
| 1. | Song M | Singer S | 5'30" |
| 2. | Song Mn | Player Ss | 4'30" |
| 3. | Song MM | Singer SS | 5'00" |

- Do you want songs other than the above?

☑ Yes
  ☐ No

- Latin genres similar to bossa nova you desired the last time are added to your list

| Musical genre check list | Musical genre check list added |
|---|---|
| ☐ Bossa nova | ☐ Afro-Cuban |
| ☐ Classic | ☐ Son |
| ☐ Jazz | ☐ Habanera |
| ☐ Pop (Western) | ☐ Samba |
| ☐ Pop (Japanese) | ☐ Rumba |
| ☐ New age | ☐ Salsa |
| ☐ Pop (Asian) | ⋮ |
| ☐ Screen music | |
| ⋮ | |

FIG.33

If you would like musicotherapy, please tell us your current physical and mental states.

- ☑ Insomnia
- ☐ Unstable
- ☐ Manic-depressive
- ☐ Nervous
- ☐ Scared
- ☐ Unwilling to do anything

......

Desired cost for one session of musicotherapy

- ☐ 2000 yen   30 minutes
- ☐ 3000 yen   45 minutes
- ☐ 4000 yen   60 minutes
- ☐ 5000 yen   90 minutes

FIG.35

| 1 | Powerful, violent, noisy, dashing, wild |
| | Calm, mild, carefree |
| 2 | Vigorous, pop, dynamic, high-spirited, vital, active |
| | Non-vigorous, deep, sentimental, romantic |
| 3 | Refreshing, light-footed, clear-out |
| | Sweltering, boisterous, lively |
| 4 | Natural, simple, stable, neutral, monotonous |
| | Dramatic, urban, sophisticated, stylish |
| 5 | Sharp, cool, tight, tense, exciting |
| | Soft |

FIG. 36
| | Audio information stream 1 | Audio information stream 2 |
|---|---|---|
| Tempo | 140 | 70 |
| Frequency characteristics |  | 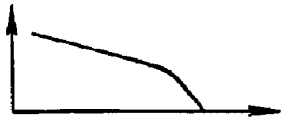 |
| Formation of instruments | 8<br>Electric base, 2 electric guitars, drums, percussion, synthesizer, vocal, trumpet | 2<br>Piano, tenor sax |
| Average pitch | 2500 | 800 |
| Fluctuation of tempo | $1/f^2$ | $1/f$ |
| Image part | Hh | Bb |

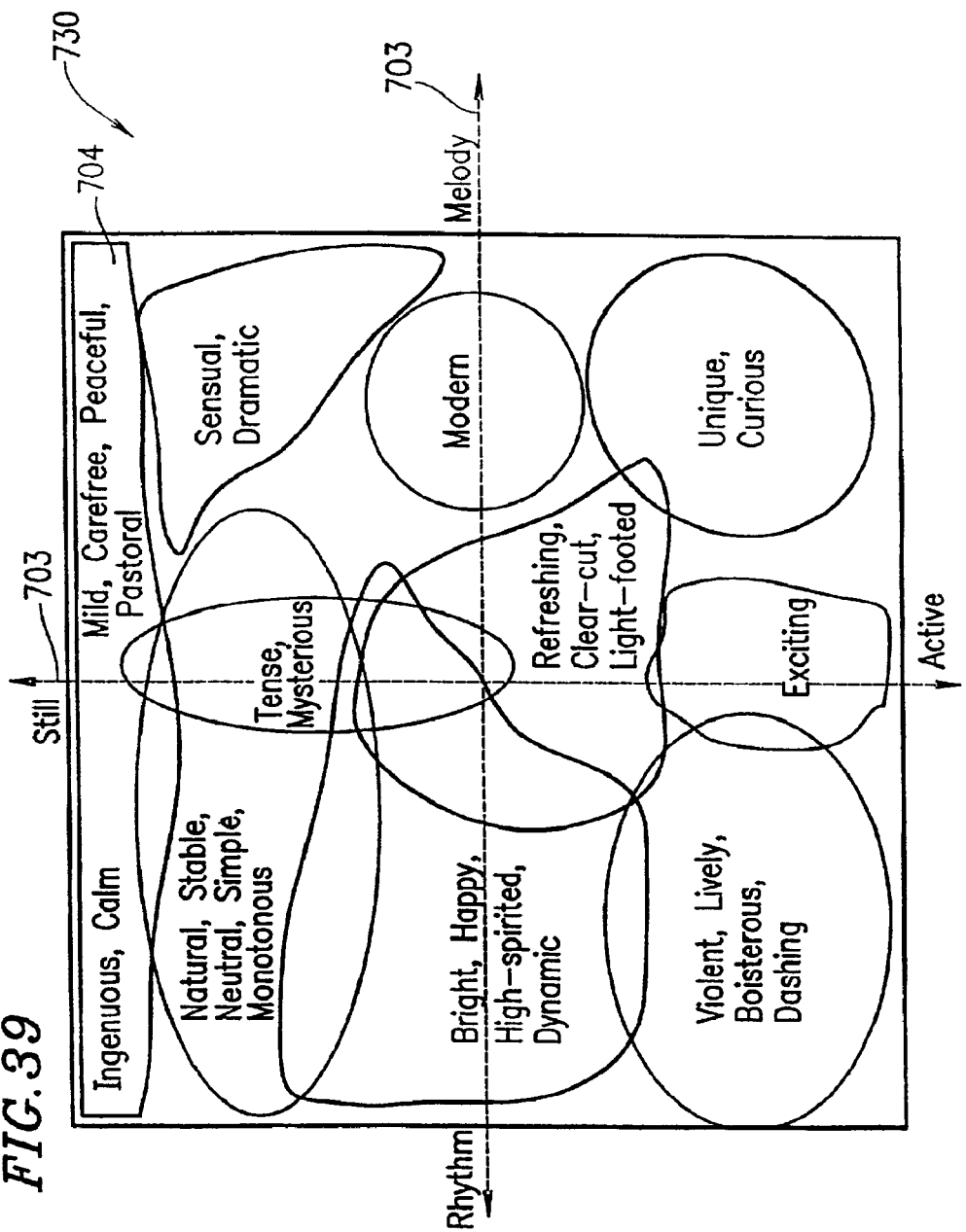

AUDIO INFORMATION PROVISION SYSTEM

FIELD OF THE INVENTION

1. Field of the Invention

The present invention relates to an audio information provision system for selecting and providing background music which is suitable to the objective and image of various spaces, for example, commercial spaces such as department stores and other types of stores, public spaces such as hotels and offices, or private spaces where people can enjoy themselves such as automobiles and houses.

2. Description of the Related Art

Conventionally, background music has been provided to commercial spaces and public spaces mainly as follows. Music selecting specialists select background music which is suitable to the image of each commercial or public space, and the selected background music is provided in the form of recording media such as CDs or the like. Alternatively, background music channels of cable broadcasting including a wide variety of music programs are subscribed to.

The system of having specialists select suitable background music uses expert knowledge and results in a high level of satisfaction of the users. However, this system is disadvantageously costly and thus can be accepted only by clients who highly appreciate the sales promoting effect of background music. In addition, the selected background music is not always suitable to the image and objective of the space or the type of customers or people within the space.

The use of recording media such as CDs requires the user to play the same background music recorded on the recording media for a certain period of time.

The subscription to cable broadcasting allows the user only to select a music genre, and the user is also required to play the predetermined programs of the selected genre for a certain period of time.

As can be appreciated from the above, it has conventionally been difficult to provide a user with background music suitable to the objective or image of each individual commercial or public space or taste of people present in the space in accordance with changes in time, environment and other conditions.

SUMMARY OF THE INVENTION

An audio information provision system for providing a target with an audio information stream suitable to the target including a database for storing a plurality of audio information streams; an inherent condition input section for receiving an inherent condition of the target; a variable condition input section for receiving a variable condition varying in accordance with time; a selection section for selecting at least one audio information stream from the plurality of audio information streams based on at least the inherent condition and the variable condition; and an output section for outputting the at least one audio information stream.

In one embodiment of the invention, the database stores a plurality of related information streams respectively related to the plurality of audio information streams. Each of the related information streams has a coordinate value representing a position of the corresponding audio information stream in a prescribed coordinate system which defines an impression of audio information streams. The selection section determines a coordinate value representing a position of the target in the prescribed coordinate system based on the inherent condition and the variable condition, and selects at least one audio information stream corresponding to at least one related information stream having a coordinate value which is located within a prescribed range from the coordinate value representing the position of the target.

In one embodiment of the invention, at least one related information stream among the plurality of related information streams includes adjustment information which indicates that a distance between a coordinate value included in the at least one related information stream and the coordinate value of the target is adjusted, based on at least one of the inherent condition and the variable condition. The selection section changes the coordinate value included in the at least one related information stream.

In one embodiment of the invention, the audio information provision system further comprises a reserved condition input section for receiving a reserved condition indicating that a preset audio information stream is output by the output section at a preset time. The output section outputs the preset audio information stream at the preset time.

In one embodiment of the invention, the audio information provision system further includes an economic condition input section for receiving an economic condition representing a desired cost for the at least one audio information stream. The selection section selects at least one audio information stream, based on the economic condition, from among the at least one audio information stream selected from the plurality of audio information streams based on the inherent condition and the variable condition.

In one embodiment of the invention, the plurality of related information streams further include a plurality of physical feature information streams each representing a physical feature of the corresponding audio information stream of the plurality of audio information streams and a plurality of bibliographical information streams each representing a bibliography of the corresponding audio information stream of the plurality of audio information streams.

In one embodiment of the invention, the selection section is connected to the inherent condition input section, the variable condition input section and the output section via a communication line.

In one embodiment of the invention, the target is one of a commercial space and a public space.

In one embodiment of the invention, the target is an individual. The inherent condition represents inherent information of the individual. The variable condition represents mood information of the individual.

In one embodiment of the invention, the audio information provision system further includes an economic condition input section for receiving an economic condition representing a desired cost for the at least one audio information stream; a mood information analysis section for analyzing the mood information and outputting a mood information analysis result; and an individual information accumulation section for accumulating the inherent condition, the mood information analysis result and the economic condition. The selection section selects at least one audio information stream, based on the economic condition, from among the at least one audio information stream selected from the plurality of audio information streams based on the inherent condition and the mood information analysis result.

In one embodiment of the invention, the mood information analysis result and the economic condition are accumulated in the individual information accumulation section as individual preference information representing an individual preference. The individual preference information is updated each time the mood information analysis result and the economic condition are input to the individual information accumulation section.

In one embodiment of the invention, the audio information provision system further includes a satisfaction degree information input section for receiving satisfaction degree information representing a satisfaction degree of the individual for the at least one audio information stream.

In one embodiment of the invention, the individual information accumulation section accumulates a past selection result provided by the selection section. The audio information provision system further includes a feedback section for presenting to variable condition input section, as individual preference information representing an individual preference, the past selection result accumulated in the individual information accumulation section. The variable condition input section provides the individual with an input interface based on the individual preference information.

In one embodiment of the invention, the audio information provision system further includes an economic condition input section for receiving an economic condition representing a desired cost for the at least one audio information stream; a mood information analysis section for analyzing the mood information and outputting a mood information analysis result; and an individual information accumulation section for accumulating the inherent condition, the mood information analysis result and the economic condition. The selection section selects at least one audio information stream from the plurality of audio information streams based on instruction information from a musicotherapist based on the inherent condition, the mood information analysis result and the economic condition.

In one embodiment of the invention, the variable condition input section inputs impression information representing an impression of an audio information stream desired by the individual as the mood information.

In one embodiment of the invention, the variable condition input section includes a display section. The variable condition input section provides the individual with a prescribed coordinate system which defines an impression of audio information streams through the display section. The impression information is input to the variable condition input section by the individual specifying at least one point in the prescribed coordinate system.

In one embodiment of the invention, the prescribed coordinate system includes a plurality of words representing the impression. The plurality of words are changed in accordance with the type of audio information stream desired by the individual.

In one embodiment of the invention, the prescribed coordinate system has a plurality of image parts.

In one embodiment of the invention, the impression is represented by at least one of a word, a color and a symbol.

Thus, the invention described herein makes possible the advantages of providing a system for selecting background music suitable to the objective or image of commercial spaces such as department stores and other types of stores, public spaces such as hotels and offices, or private spaces where people can enjoy themselves such as automobiles and houses.

These and other advantages of the present invention will become apparent to those skilled in the art upon reading and understanding the following detailed description with reference to the accompanying figures.

BRIEF DESCRIPTION OF THE DRAWINGS

FIGS. 5A, 5B and 5C each show an input interface used for inputting an inherent condition according to the first example;

FIG. 6 shows an input interface used for inputting a variable condition according to the first example;

FIG. 12 shows a component score coefficient for each space ID according to the first example;

FIG. 14 shows an impression space coordinate value for each space ID according to the first example;

FIG. 15 shows classification by time-and-day-of-the-week ID according to the first example;

FIG. 17 shows classification by season ID according to the first example;

FIG. 19 shows classification by weather condition ID according to the first example;

FIG. 21 shows adjustment information of each musical genre by space ID according to the first example;

FIG. 22 shows adjustment information for related bibliographical information of each special space ID according to the first example;

FIG. 23 shows adjustment information for related bibliographical information of each special season ID according to the first example;

FIG. 26 shows an input interface used by a user for inputting inherent information, mood information and economic condition to a terminal;

FIG. 27 shows mood information input by the user and the analysis result provided by a mood information analysis section;

FIG. 29 shows an input interface used for inputting, to a satisfaction degree input section, whether the provided audio information was sampled, whether the user was satisfied with the provided audio information stream, and the image the user has on the audio information stream that he/she was not satisfied with;

FIG. 30 shows an input interface used for inputting mood information to a variable condition input section;

FIG. 33 shows an input interface of a variable condition input section and an economic condition input section used when the user demands musicotherapy;

FIG. 35 shows classification of representative adjectives by music image according to the fifth example;

FIG. 36 shows the relationship between the musical features and the music image parts;

FIG. 39 shows still another coordinate system representing a music image chart according to the fifth example.

DESCRIPTION OF THE EMBODIMENTS

Hereinafter, the present invention will be described by way of illustrative examples with reference to the accompanying drawings.

EXAMPLE 1

Figure 1:
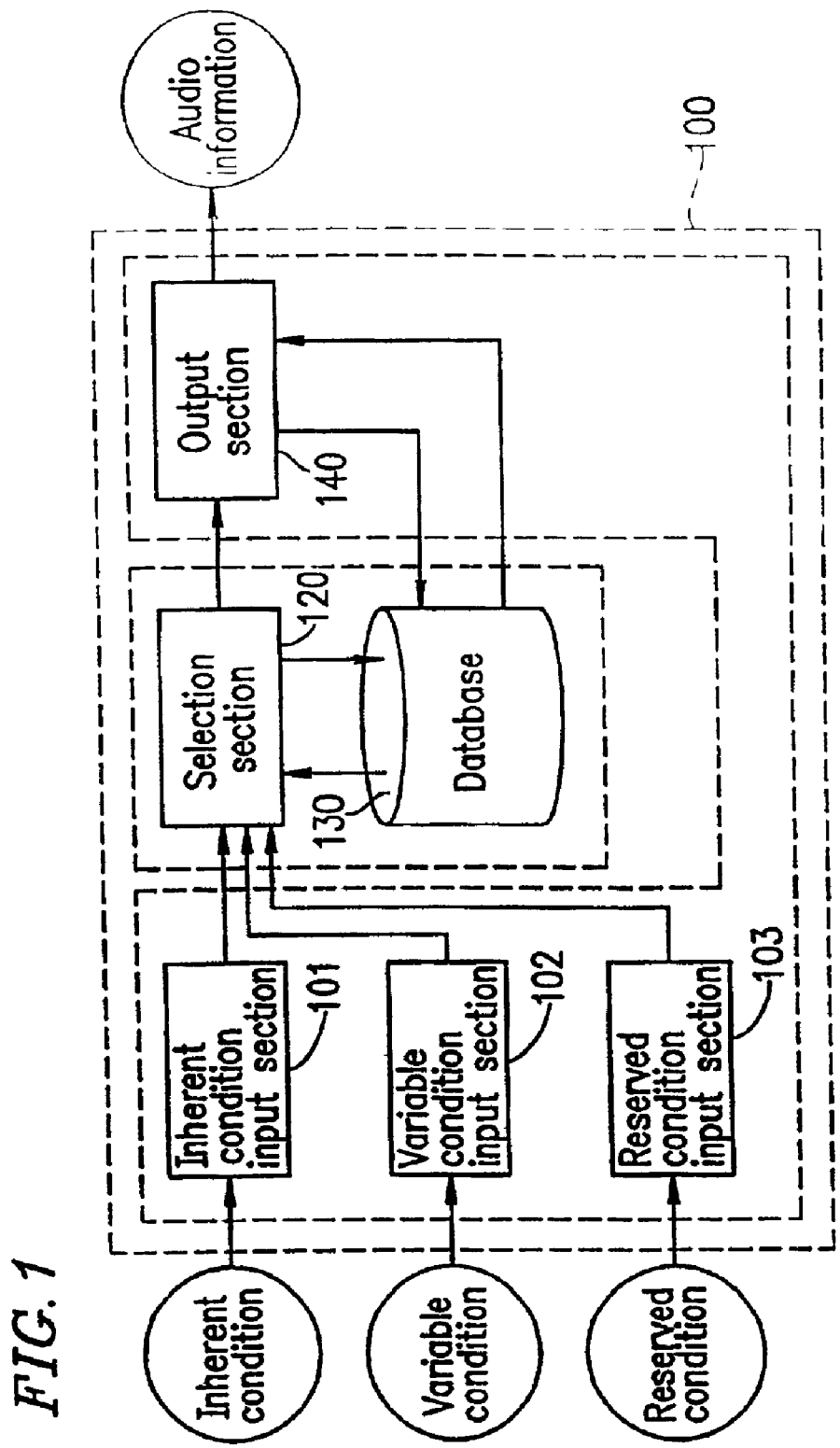
FIG. 1 shows an audio information provision system according to a first example of the present invention.

FIG. 1 shows an audio information provision system 100 according to a first example of the present invention. In the first example, the audio information provision system 100 provides a commercial or public space with audio information suitable thereto as, for example, background music.

The audio information provision system 100 includes a database 130 storing a plurality of audio information streams, an inherent condition input section 101 for receiving an inherent condition which is inherent to a commercial or public space, a variable condition input section 102 for receiving a variable condition which is variable in accordance with time, a selection section 120 for selecting at least one audio information stream from the plurality of audio information streams based at least on the inherent condition and the variable condition, an output section 140 for outputting the at least one audio information stream selected by the selection section 120, and a reserved condition input section 103 for receiving a reserved condition which indicates that a preset audio information stream is output by the output section 140 at a preset time.

The audio information provision system 100 can be implemented in various forms, and elements of the audio information provision system 100 can be connected to each other in various forms. For example, each element of the audio information provision system 100 can be implemented by hardware, software, or a combination of hardware and software.

Figure 2:
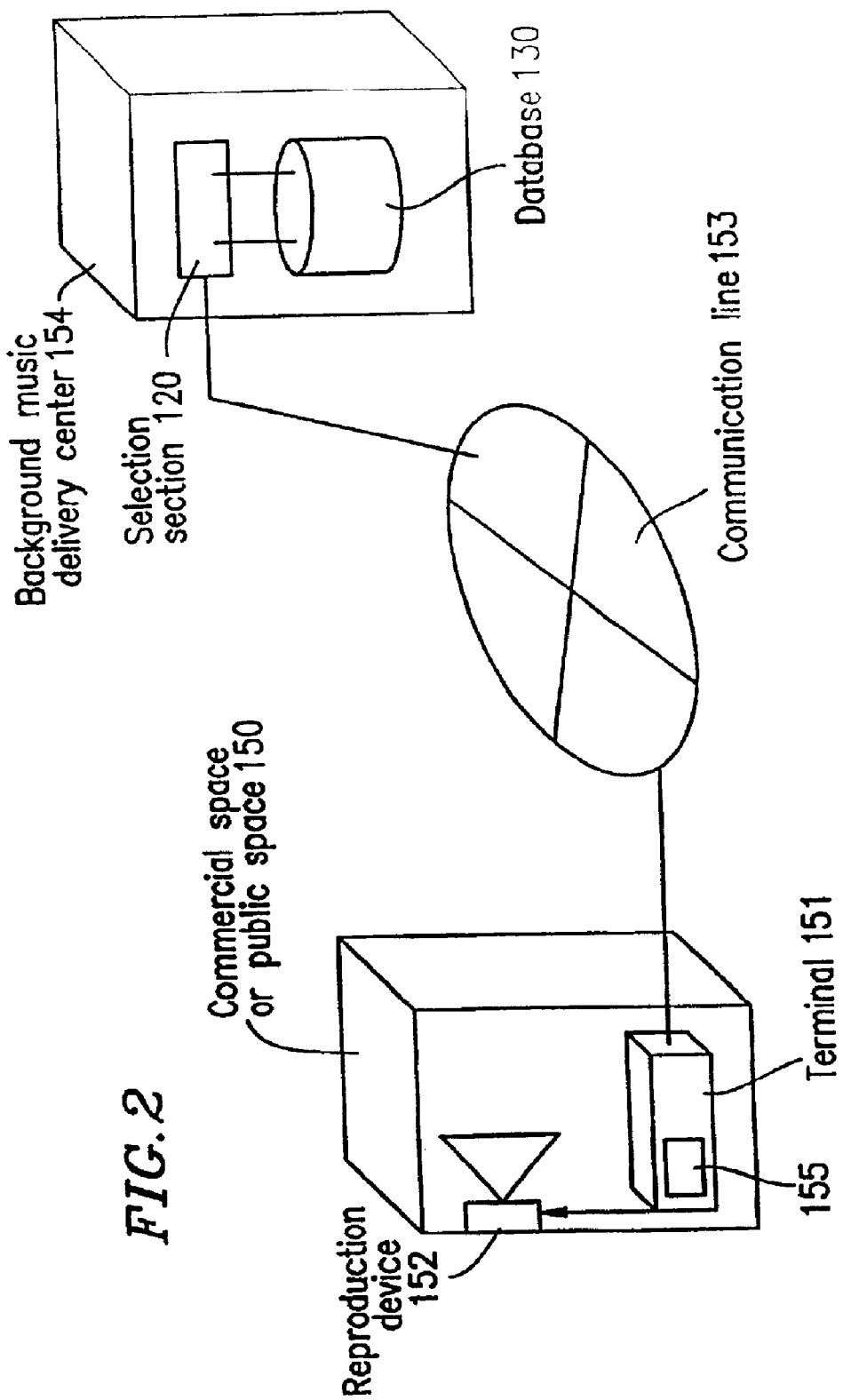
FIG. 2 shows an information delivery system using the audio information provision system according to the first example and a communication line.

The selection section 120 can be connected to the inherent condition input section 101, the variable condition input section 102, the reserved condition input section 103, and the output section 140 through a communication line (as shown in FIG. 2).

FIG. 2 shows an exemplary information delivery system provided by the audio information provision system 100 using a communication line 153 according to the present invention.

The information delivery system includes, for example, a terminal 151 used by a user in a commercial or public space 150 and a background music delivery center 154 of an information service organization providing information to the terminal 151. In the commercial or public space 150, the audio information is recorded and reproduced by the terminal 151 and provided to the commercial or public space 150 through a reproduction device 152 as background music. The database 130 and the selection section 120 are in the background music delivery center 154. The background music delivery center 154 manages a huge amount of audio information (for example, audio contents) stored in the database 130. The background music delivery center 154 and the terminal 151 transmit information to each other through a communication line 153. The communication line 153 can be, for example, a network, a wireless communication line or a wired communication line (for example, the Internet, a satellite communication line or a telephone line).

The inherent condition input section 101, the variable condition input section 102, the reserved condition input section 103 and the output section 140 can be in the terminal 151.

The terminal 151 can be, for example, a personal computer or a dedicated terminal device.

In the case where the terminal 151 is a personal computer, the user can input an inherent condition, a variable condition and a reserved condition to the terminal 151 using an input section such as a keyboard, a mouse, a touch pad or the like connected (wired or wireless) to the personal computer, while viewing a display 155. The user can also receive audio information from the reproduction device 152 connected to the personal computer.

In the case where the terminal 151 is a dedicated terminal device, each of the conditions can be input using the display 155 or the like incorporated therein.

An "inherent condition" refers to a condition which is inherent to a target to which the audio information is provided. An inherent condition is, for example, an image based on the product concept, building, location or type of customers of a commercial space such as a store.

Figure 5A:
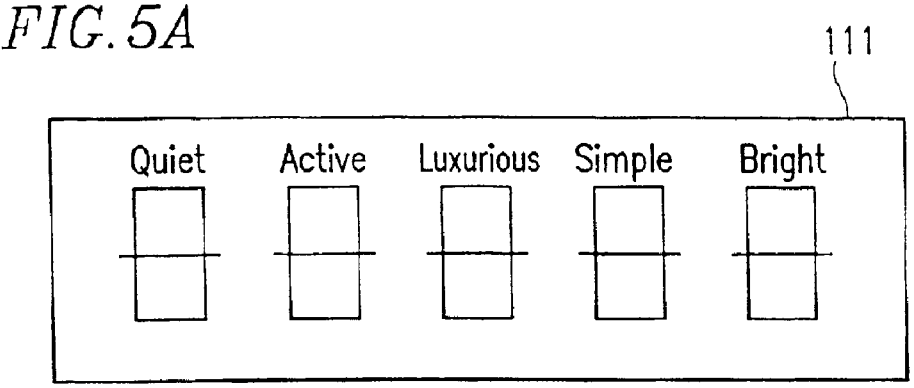
Figure 5B:
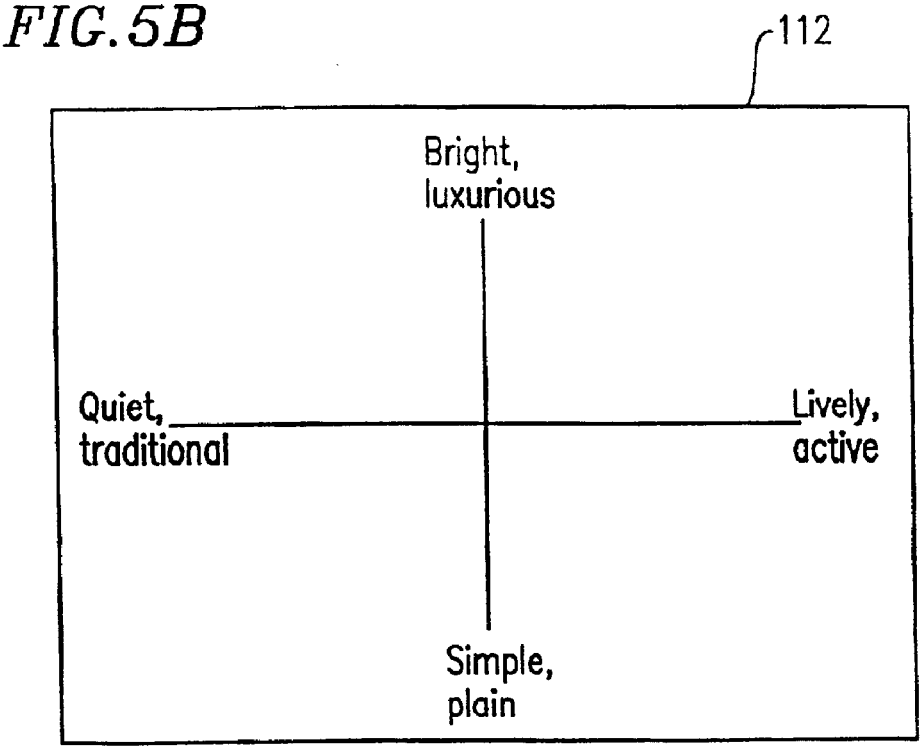

FIGS. 5A, 5B and 5C each show an exemplary input interface used as the inherent condition input section 101 (FIG. 1) used by the user to input an inherent condition to the terminal 151. Input interfaces 111, 112 and 113 respectively shown in FIGS. 5A, 5B and 5C are displayed on, for example, the screen of the display 155 of the terminal 151.

The input interfaces 111, 112 and 113 are preferably user-friendly input interfaces which represent the image of the commercial or public space 150 with words or colors.

The words representing the image of the commercial or public space 150 shown in the input interfaces 111, 112 and 113 are "impression representing words", which is unique to an audio information provision system according to the present invention. The impression representing words can be selected using a mathematical technique such as factor analysis or principal component analysis from a plurality of words used by the music selecting specialists or store designers.

The input interface 111 (FIG. 5A) is designed to allow the user to input an image with an input bar including the impression representing words. The input interface 112 (FIG. 5B) is designed to allow the user to input an image by specifying one point in a two-dimensional coordinate system including two perpendicular factors. The input interface 112 can have a color map including colors instead of the impression representing words.

The input interface 113 (FIG. 5C) allows the user to input a specific name of a commercial or public space as an inherent condition. This dispenses the user from the need to consider the image of the store for providing the store with audio information suitable thereto. This also allows audio information which is certainly suitable for the store which it is to be provided.

A "variable condition" refers to a condition which varies in accordance with time. The variable condition can vary from moment to moment and is, for example, the season, date, time, weather, temperature, humidity, or crowdedness.

FIG. 6 shows an exemplary input interface used as the variable condition input section 102 (FIG. 1) used by the user to input a variable condition to the terminal 151. An input interface 114 shown in FIG. 6 is displayed on, for example, the screen of the display 155 of the terminal 151. The time and date, and the day of the week are automatically displayed by the clock function of the personal computer or the dedicated terminal device acting as the terminal 151. The environmental data such as the weather, temperature and humidity can be automatically delivered by the communication function of the terminal 151. Thus, the user is dispensed from the trouble of inputting such data.

A "reserved condition" refers to that a preset audio information stream is output by the output section 140 (FIG. 1) at a preset time. When a reserved condition is input to the terminal 151, the output section 140 outputs the following predetermined audio information streams to the shoppers at the store at a predetermined time: for example, the time signal, a sound effect for promoting sales, a notice of time-limited discount or a notice of store opening or closing. The contents of the reserved condition (the type of audio information streams or time to output each audio information stream) can be set differently store to store.

Figure 7:
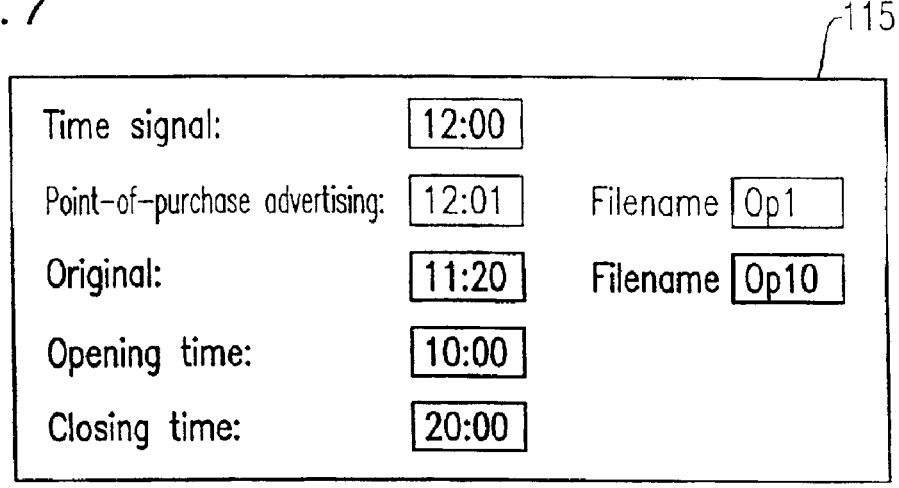
FIG. 7 shows an input interface used for inputting a reserved condition according to the first example.

FIG. 7 shows an exemplary input interface used as the reserved condition input section 103 (FIG. 1) used by the user to input a reserved condition to the terminal 151. An input interface 115 shown in FIG. 7 is displayed on, for example, the screen of the display 155 of the terminal 151. The input interface 115 allows the user to set the time to provide the store with the time signal or notice of store opening or store closing. The input interface 115 also allows the user to set the time to provide the sound effect for promoting sales or the notice of time-limited discount. The type of sound effect or the type of notice can be set by inputting a filename.

Figure 8:
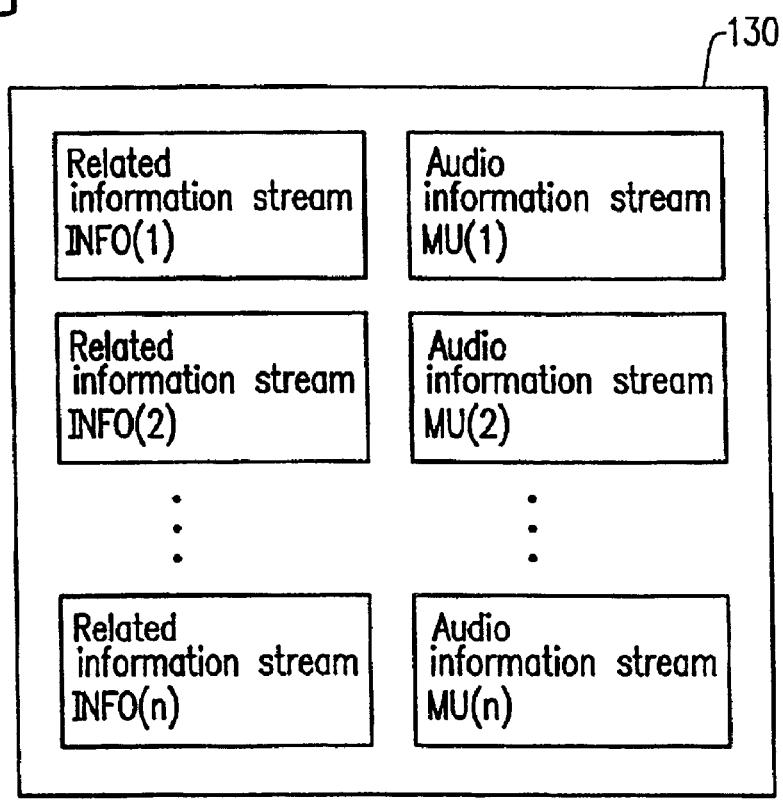
FIG. 8 shows a structure of information stored in a database.

The database 130 stores in advance a huge amount of audio information streams. FIG. 8 shows the form of the audio information streams being stored. The database 130 stores audio information streams MU(1) through MU(n) and related information streams INFO(1) through INFO(n) respectively related to the audio information streams MU(1) through MU(n). Related information stream INFO(n) includes, for example, a physical feature, an impression space coordinate value, bibliographic information or the like regarding each audio information stream (for example, a song). A "physical feature" refers to the tempo, pitch, loudness, envelope or the like inherent to a song. A physical feature is obtained by general acoustic signal processing such as, for example, frequency spectrum analysis, Wigner analysis, autocorrelation analysis or the like of the song. An "impression space coordinate value" refers to a value in a coordinate system which represents an impression space determined in advance using the impression representing words inherent to the target space such as a commercial space. The coordinate system can define the impression of the audio information streams. "Bibliographical information" refers to the title, performer, formation of instruments, musical genre, time of composition of the song or the like.

In this specification, the term "song" is defined to refer to a tune with or without lyrics.

Figure 9:
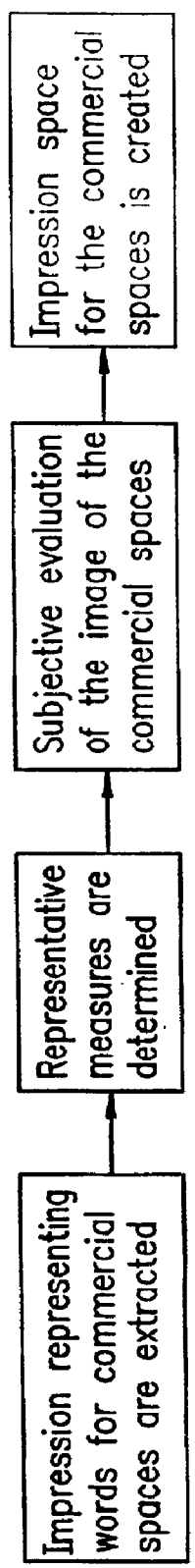
FIG. 9 shows a process for creating an impression space according to the first example.
Figure 13:
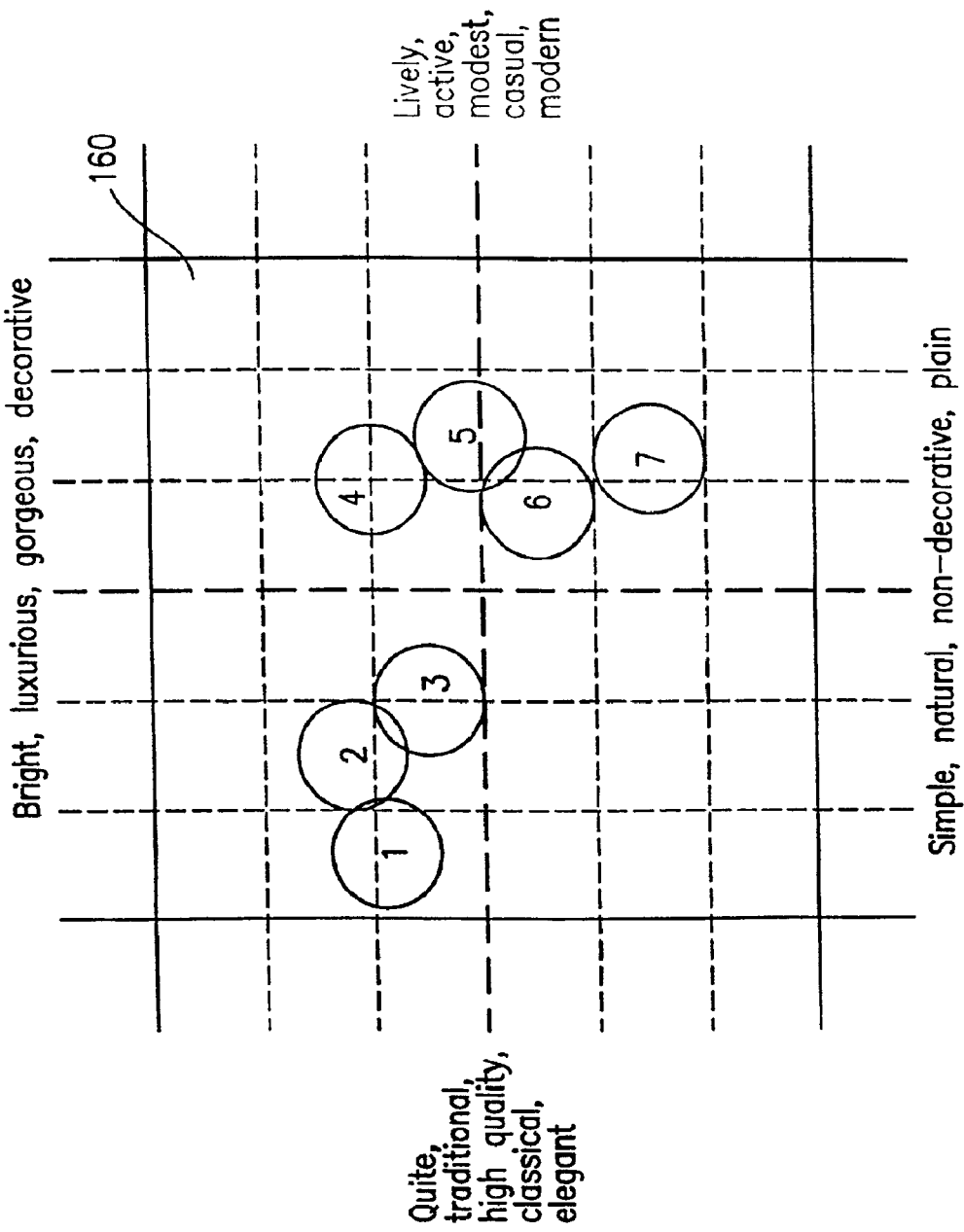
FIG. 13 shows an impression space to which space IDs are mapped according to the first example.

Hereinafter, a method for obtaining an impression space coordinate value of an audio information stream will be described. FIG. 9 shows a process for creating an impression space for commercial spaces. First, a plurality of words representing the impression of commercial spaces are extracted. From the plurality of words, representative pairs of impression representing words used by unspecified people with high frequency such as, for example, "quiet—lively" and "luxurious—frugal" are selected. Each of these representative pairs of impression representing words is determined as a representative measure. Then, using an impression space including coordinate axes, each for one representative measure, a plurality of evaluators perform subjective evaluation of the images of the commercial spaces using a psychological evaluation technique such as the SD (Semantic Differential) method. The evaluation result is processed with a mathematical technique such as, for example, factor analysis or principal component analysis. Thus, from the above-mentioned impression space, another impression space having two coordinate axes perpendicular to each other is defined. FIG. 13 shows an exemplary coordinate system which represents an impression space for the commercial spaces.

Figure 10:
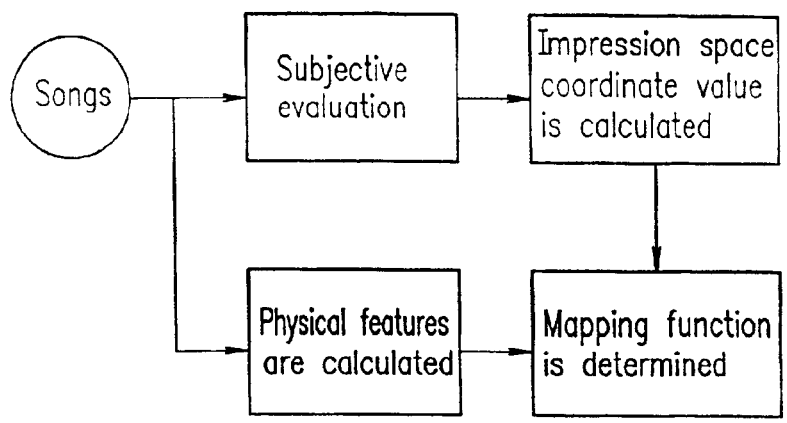
FIG. 10 shows a process for obtaining a mapping function according to the first example.

FIG. 10 shows a process for determining a mapping function for mapping songs, which are audio information streams, to the above-described coordinate system which represents the impression space for the commercial spaces. A plurality of songs which are used as samples are processed with subject evaluation using the same measures and evaluators as used for the subject evaluation for the images of the commercial spaces. Then, from the analysis result and evaluation result obtained when the impression space for the commercial spaces is defined, an impression space coordinate value of each of the plurality of songs used as samples in the coordinate system representing the impression space for the commercial spaces is calculated. In parallel, physical features of the plurality of songs are calculated. From the relationship between the calculated coordinate values in the impression space and the calculated physical features, a mapping function for mapping a song to the coordinate system which represents the impression space for the commercial spaces is determined using a mathematical technique such as the multiple regression analysis or the like. Several ten to about a hundred songs can be used as samples for obtaining the mapping function.

Figure 11:
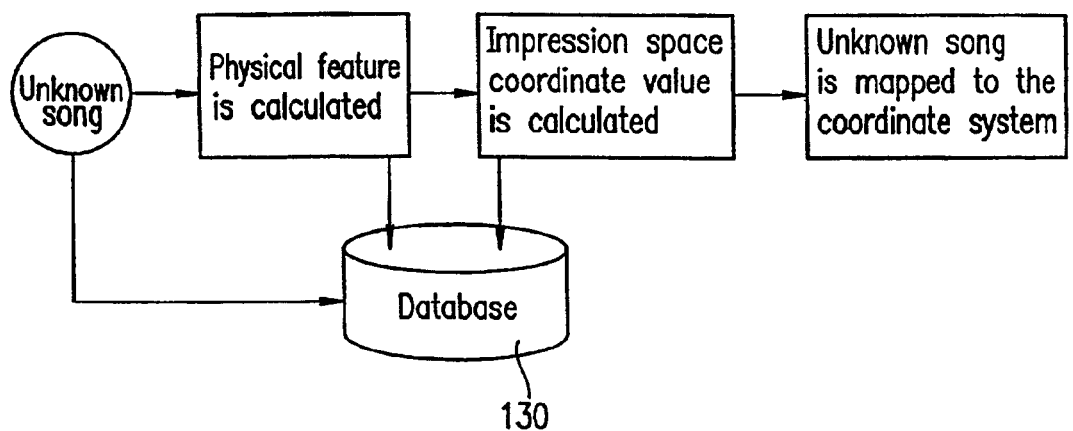
FIG. 11 shows a process for performing mapping to the impression space according to the first example.

FIG. 11 shows a process for mapping an enormous number of unknown songs to the coordinate system which represents the impression space for the commercial spaces.

Once a physical feature of an unknown song is calculated, an impression space coordinate value of the unknown song is automatically calculated based on the mapping function determined by the above-described process. Using the calculated impression space coordinate value, the unknown song can be mapped to the coordinate system which represents the impression space for the commercial spaces. The song of which the impression space coordinate value has been determined is stored in the database 130 as an audio information stream. The calculated physical feature and the calculated impression space coordinate value are also stored in the database 130 as related information streams.

Figure 3:
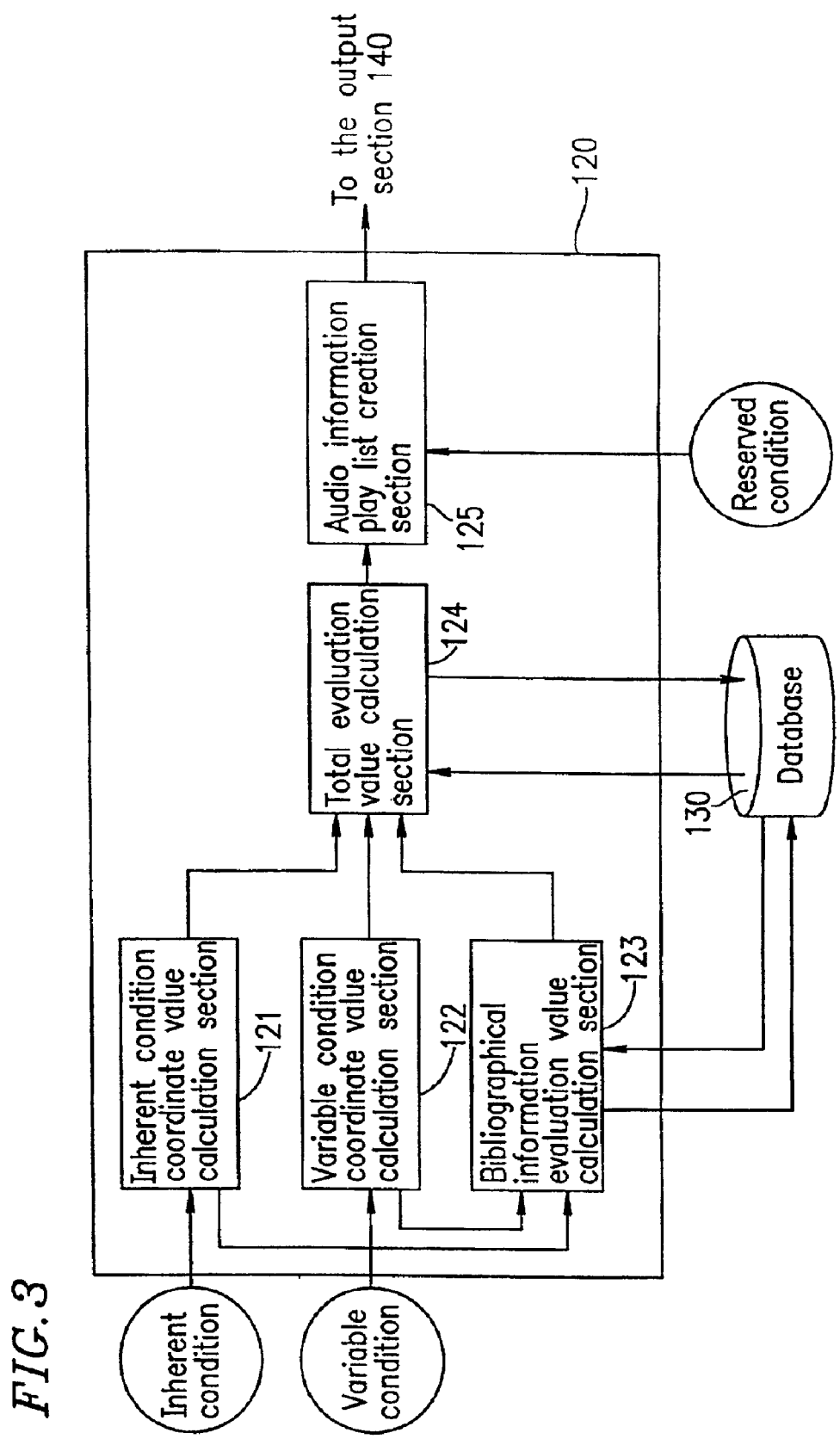
FIG. 3 shows a structure of a selection section of the audio information provision system according to the first example.

With reference to FIG. 3, the selection section 120 also shown in FIG. 1 will be described. The selection section 120 includes an inherent condition coordinate value calculation section 121, a variable condition coordinate value calculation section 122, a bibliographical information evaluation value calculation section 123, a total evaluation value calculation section 124, and an audio information play list creation section 125.

The inherent condition coordinate value calculation section 121 analyzes the inherent condition of the commercial space which has been input to the inherent condition input section 101 and determines the impression space coordinate value suitable to the inherent condition. The variable condition coordinate value calculation section 122 analyzes the variable condition of the commercial space which has been input to the variable condition input section 102 and determines the impression space coordinate value suitable to the variable condition. The bibliographical information evaluation value calculation section 123 outputs adjustment information to the total evaluation value calculation section 124. The adjustment information adjusts the probability at which an audio information stream relating to at least either one of the inherent condition which has been input to the inherent condition input section 101 and the variable condition which has been input to the variable condition input section 102 is selected by the selection section 120.

The total evaluation value calculation section 124 analyzes the impression space coordinate value suitable to the inherent condition, the impression space coordinate value suitable to the variable condition, and the adjustment information, and selects an audio information stream from the database 130. The audio information play list creation section 125 analyzes the audio information stream selected by the total evaluation value calculation section 124 and the reserved condition which has been input to the reserved condition input section 103, and determines the order by which the plurality of audio information streams are to be output by the output section 140. Hereinafter, the operation of the selection section 120 will be described in more detail.

FIG. 12 shows a table representing results of subjective evaluation of the image of a plurality of commercial spaces. The table is used by the inherent condition coordinate value calculation section 121. In FIG. 12, the space ID is used to identify a type of stores having a common representative image provided by the inherent condition input to the inherent condition input section 101. The subjective evaluation results are shown, for each space ID, by component score coefficients obtained by the SD method. For example, high quality store A represented by space ID 1 obtained the following score coefficients for the following images: (quiet, active, luxurious, moderate price, traditional, casual, modern, bright)=(0.5, −0.5, 0.4, −0.6, 0.9, −0.4, −0.4, 0.2). FIG. 14 shows an example of the impression space coordinate values in a two-dimensional coordinate system which represents the impression space for the commercial spaces.

The impression space coordinate values are obtained based on the above-described results. FIG. 13 shows two-dimensional coordinate system 160 representing the impression space for the commercial spaces. In the coordinate system 160, the impression space coordinate values of space IDs 1 through 7 are mapped. The center of each circle is the position represented by the impression space coordinate value of each of the spaces ID 1 through 7. FIG. 13 indicates that the images of the commercial spaces such as department stores and other stores can be mapped to the coordinate system 160.

The process shown in FIG. 3 can be summarized as follows. When the user inputs the image of a commercial space using, for example, the input interface 111 shown in FIG. 5A, the component score coefficients shown in FIG. 12 are determined. Then, the impression space coordinate value is determined by the result of the principal component analysis. When the input interface 112 shown in FIG. 5B is used, an impression space coordinate value is directly input. When the input interface 113 shown in FIG. 5C is used, the name of a specific commercial space input and an impression space coordinate value shown in FIG. 14 is determined based on the name. The impression space coordinate value is the inherent condition coordinate value which is calculated by the inherent condition coordinate value calculation section 121. Here, the inherent condition coordinate value is represented as "A".

Figure 16:
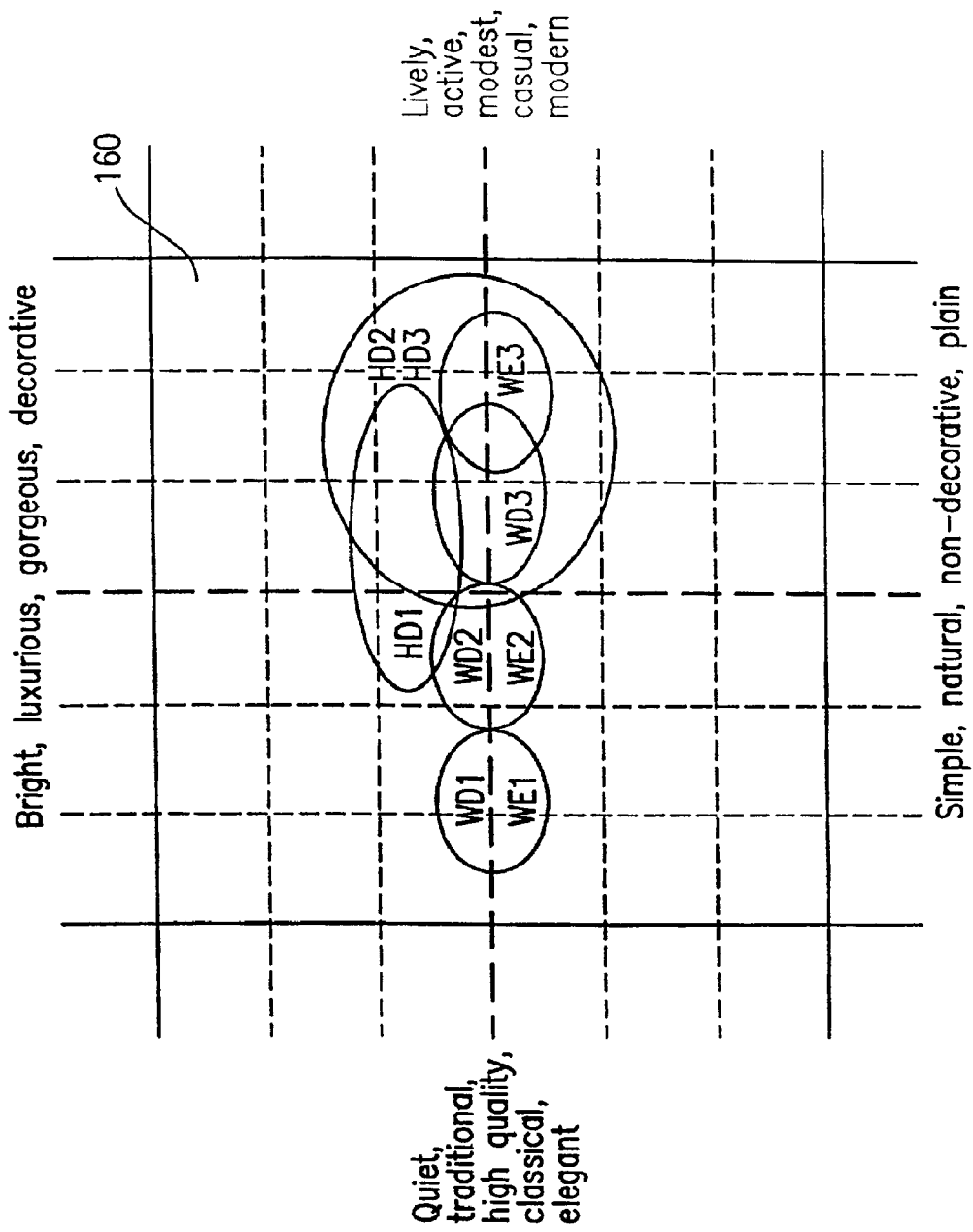
FIG. 16 shows an impression space to which time-and-day-of-the-week IDs are mapped according to the first example.

FIG. 15 shows a table representing classification of a variable condition component of a commercial space regarding the time and the day of the week which has been input to the variable condition input section 102. The table is used by the variable condition coordinate value calculation section 122. In a commercial space, the type of customers and crowdedness are varied in accordance with the time and the day of the week. The time is classified as, for example, AM and PM, and the day of the week is classified as, for example, weekdays and weekend. In FIG. 15, each classification tag is provided with an ID (in parenthesis). For example, the time-and-day-of-the-week ID for Tuesday, 3 p.m. is WD 2. FIG. 16 shows a result of nine time-and-day-of-the-week IDs obtained by combining the classification tags in FIG. 15 being mapped to the coordinate system 160. It is not necessary to map all of the time-and-day-of-the-week IDs to the coordinate system 160.

Figure 18:
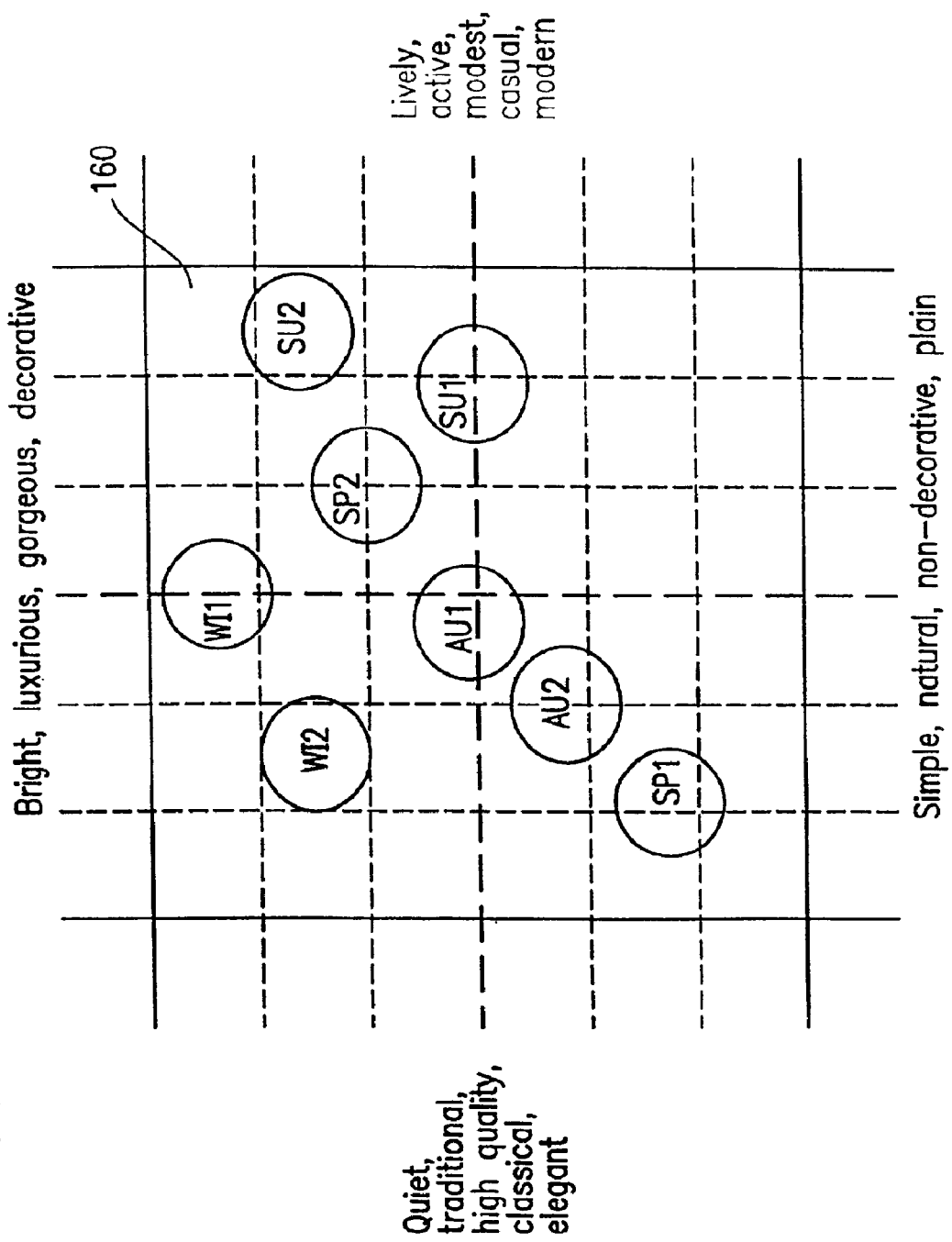
FIG. 18 shows an impression space to which season IDs are mapped according to the first example.

FIG. 17 shows a table representing classification of a variable condition component of a commercial space regarding the season which has been input to the variable condition input section 102. The table is used by the variable condition coordinate value calculation section 122. In a commercial space, the taste and actions of customers are varied in accordance with the season. The season is classified as, for example, spring, summer, etc., or by month. In FIG. 17, each classification tag is provided with an ID. For example, the season ID for November 4 is AU 2. Since some events occur in a particular season, special season IDs are also provided. For example, a period from April 1 to April 10 when schools hold entrance ceremonies is provided with the special season ID of SP2A. FIG. 18 shows a result of the season IDs in FIG. 17 being mapped to the coordinate system 160. It is not necessary to map all of the season IDs and all the special season IDs to the coordinate system 160.

FIG. 19 shows a table representing classification of a variable condition component of a commercial space regarding the weather conditions which has been input to the variable condition input section 102. The table is used by the variable condition coordinate value calculation section 122. In a commercial space, the taste and actions of customers are varied in accordance with the weather conditions. The weather conditions are classified by the elements such as, for example, weather, temperature, humidity, discomfort index, etc. In FIG. 19, each classification tag is provided with an ID. For example, when the weather is fine, the temperature is 15° C. and the humidity is 30%, the discomfort index is comfortable, and thus the weather condition ID is F 300. The discomfort index Di is obtained by expression (1) from the temperature T (° C.) and the relative humidity U (%) as follows:

$$Di=0.81T+0.01U(0.99T-14.3)+46.3 \qquad (1).$$

Figure 20:
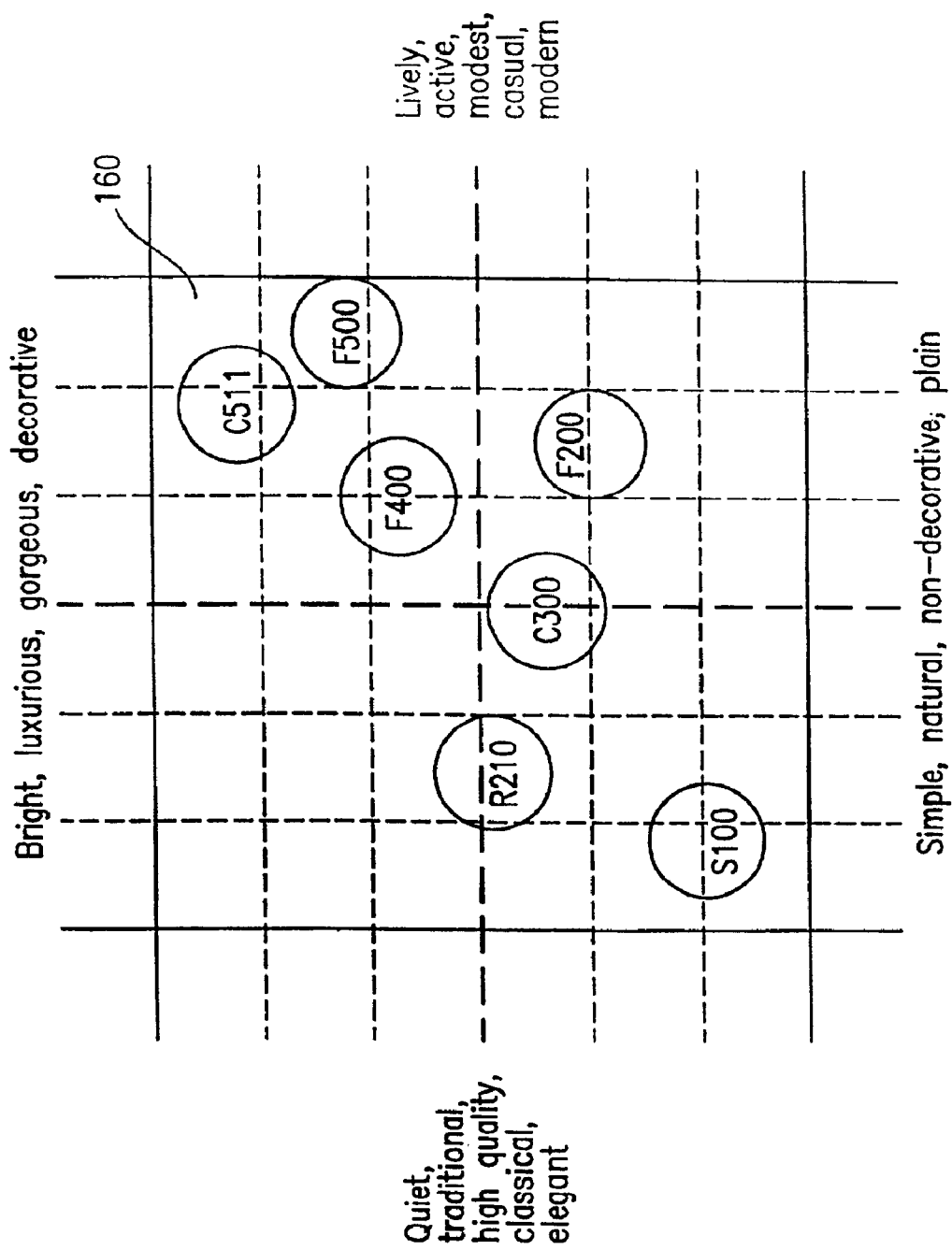
FIG. 20 shows classification by weather condition ID according to the first example.

In this example, the discomfort index Di is classified into three stages of: comfortable, slightly uncomfortable and uncomfortable. FIG. 20 shows a result of weather condition IDs obtained by combining the classification tags in FIG. 19 being mapped to the coordinate system 160. It is not necessary to map all of the weather condition IDs to the coordinate system 160.

The process performed by the variable condition coordinate value calculation section 122 shown in FIG. 3 will be further described.

The user inputs a variable condition using the input interface 114 or the like shown in FIG. 6 (alternatively, the time and date can be automatically set by a built-in function of the terminal 151, and the temperature and humidity can be delivered from the background music delivery center or the like as weather condition information which changes from moment to moment). Then, the time-and-day-of-the-week ID (FIG. 15), the season ID or the special season ID (FIG. 17), and the weather condition ID (FIG. 19) are determined. Thus, the impression space coordinate value C of the time-and-day-of-the-week ID, the impression space coordinate value D of the season ID (or the special season ID), and the impression space coordinate value E of the weather condition ID are determined. The variable condition coordinate value B is determined by expression (2) as follows:

$$B=cC+dD+eE \qquad (2).$$

The additions (+) performed in expression (2) indicate the following: when the positions represented by the coordinate values C, D and E are in the same quadrant of the coordinate system, the variable condition coordinate value B is calculated so as to be at the center of the three positions; and when the positions represented by the coordinate values C, D and E are in different quadrants of the coordinate system, the variable condition coordinate value B is calculated by performing vector calculation of the coordinate values C, D and E. Weighting coefficients c, d and e are determined in accordance with a prescribed rule. Which of the coordinate values C, D and E is to be the main element to calculate the variable condition coordinate value B can be adjusted by giving different values to the weighting coefficients c, d and e.

The total evaluation value calculation section 124 shown in FIG. 3 calculates a total evaluation value M, which is the final coordinate value of the target commercial space, using expression (3) based on the inherent condition coordinate value A and the variable condition coordinate value B.

$$M=aA+bB \qquad (3)$$

Like in expression (2), the addition (+) performed in expression (3) indicates the following: when the positions represented by the coordinate values A and B are in the same quadrant of the coordinate system, the total evaluation value M is calculated so as to be at the center between the two positions; and when the positions represented by the coordinate values A and B are in different quadrants of the coordinate system, the total evaluation value M is calculated by performing vector calculation of the coordinate values A and B. In expression (3), a and b are weighting coefficients.

The coordinate value represented by the total evaluation value M is the coordinate value of the target commercial space. Regarding the coordinate system 160, the total evaluation value calculation section 124 selects an audio information stream corresponding to a related information stream having coordinate values within a prescribed range (for example, one) from the coordinate value represented by the total evaluation value M.

The adjustment information which is output by the bibliography information evaluation value calculation section 123 is stored in advance in the related information stream INFO(n) shown in FIG. 8. The adjustment information is created in advance using a meta data creation tool for the audio information provision system according to the present invention, with reference to the bibliographical information corresponding to the audio information stream. The adjustment information is determined for each space ID, each time-and-day-of-the-week ID, each season ID and each weather condition ID. For example, the adjustment information shows the following values: +∞ when the corresponding audio information is "never selected" as the background music for the target commercial space, 0 when the corresponding audio information is "absolutely selected", ½ when the corresponding audio information is suitable, and 2 when the corresponding audio information is not very suitable. The adjustment information acts as a "filter for preventing deviation from social commonsense" so that songs such as "Chanson de l'adieu" are never used in wedding reception houses.

FIG. 21 shows an example of adjustment information for each musical genre for each space ID. FIG. 22 shows an example of adjustment information for each special space ID. FIG. 23 shows an example of adjustment information for each season ID.

The process performed by the bibliographical information evaluation value calculation section 123 shown in FIG. 3 will be further described.

The user inputs an inherent condition and a variable condition using the input interfaces 111, 112, 113 and 114 shown in FIGS. 5A, 5B, 5C and 6. Then, the bibliographical information evaluation value calculation section 123 inquires to the database 130 about the adjustment information included in the related information stream INFO(n) shown in FIG. 8 based on the space ID, the season ID, the time-and-day-of-the-week ID, the weather condition ID, and then retrieves an audio information stream related to the adjustment information stream corresponding to one of at least the inherent condition and the variable condition. The bibliographical information evaluation value H, which is the final adjustment information, is determined by expression (4) based on adjustment information F determined based on the bibliographical information related to the inherent condition of the audio information stream and adjustment information G determined based on the bibliographical information related to the variable condition of the audio information stream.

$$H=fF+gG \qquad (4)$$

In expression (4), f and g are weighting coefficients. The bibliographical information evaluation value H is output to the total evaluation value calculation section 124. The total evaluation value calculation section 124 multiplies the distance between the coordinate value assigned to the above-mentioned related audio information stream and the coordinate value represented by the total evaluation value M, with the bibliographical information evaluation value H, so as to adjust the distance. The distance is adjusted by changing the coordinate value assigned to the related audio information stream. When the bibliographical information evaluation value H is 0, the distance is 0 and therefore the related audio information stream is necessarily selected by the total evaluation value calculation section 124. When the bibliographical information evaluation value H is +∞, the distance is +∞ and therefore the related audio information stream is never selected by the total evaluation value calculation section 124.

The audio information play list creation section 125 shown in FIG. 3 analyzes the audio information stream selected by the total evaluation value calculation section 124 and the reserved condition, and determines the order in which the audio information streams are output from the output section 140. The order can be determined in various manners in accordance with the objective. For example, the songs can be reproduced by the method of matching the tempo and loudness of the songs to the fluctuate curve of 1/f (f: frequency), to the human fatigue curve, or human biorhythm of the parasympathetic nervous system and the sympathetic nervous system. The audio information play list can be created in units of one hour or in units of one day.

The output section 140 can output the audio information in accordance with the play list output from the audio information play list creation section 125 shown in FIG. 3.

EXAMPLE 2

Figure 4:
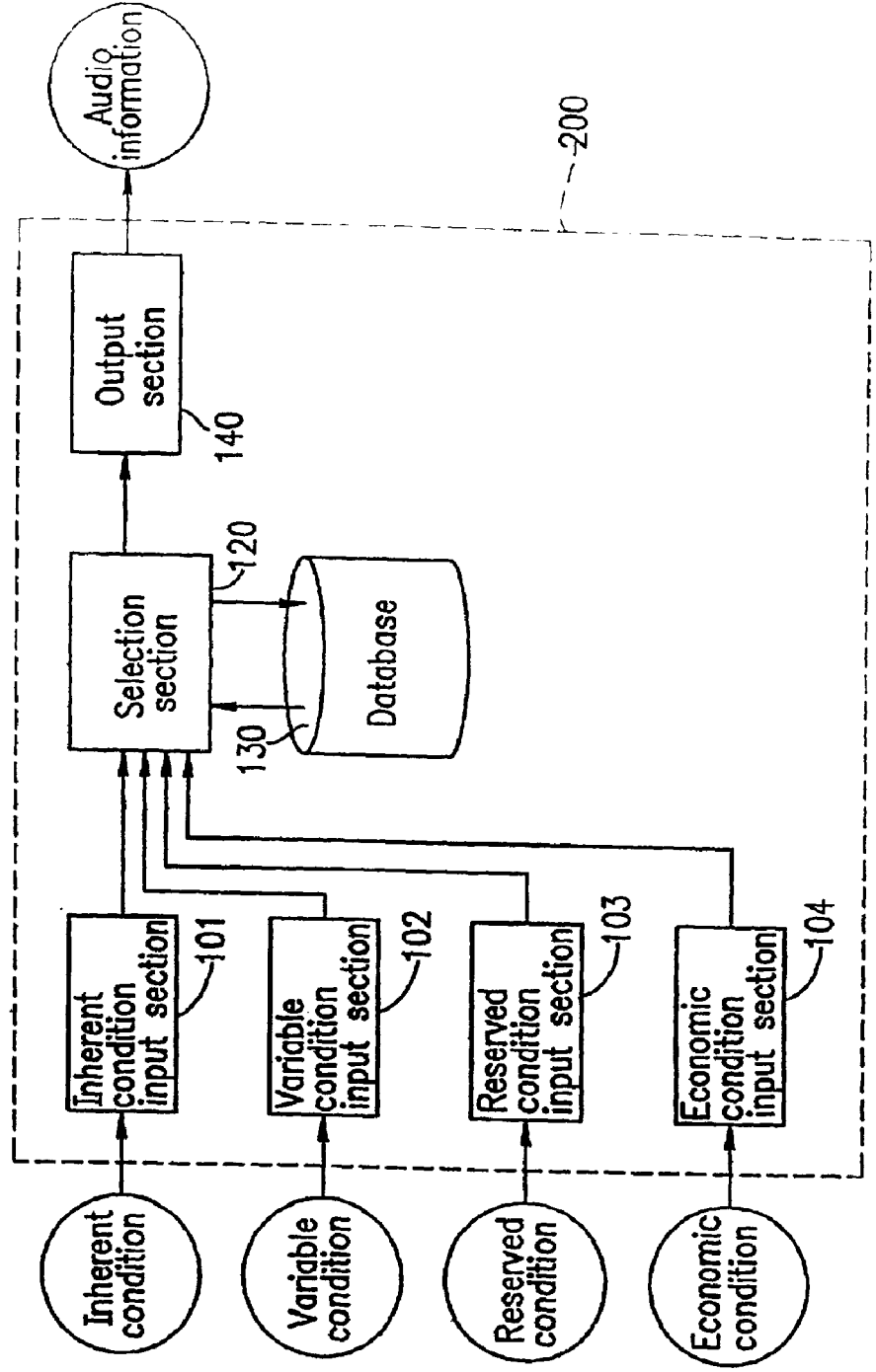
FIG. 4 shows an audio information provision system according to a second example of the present invention.

FIG. 4 shows an audio information provision system 200 according to a second example of the present invention. In FIG. 4, identical elements as those described above with reference to FIG. 1 bear identical reference numerals therewith and detailed descriptions thereof will be omitted.

Figure 24:
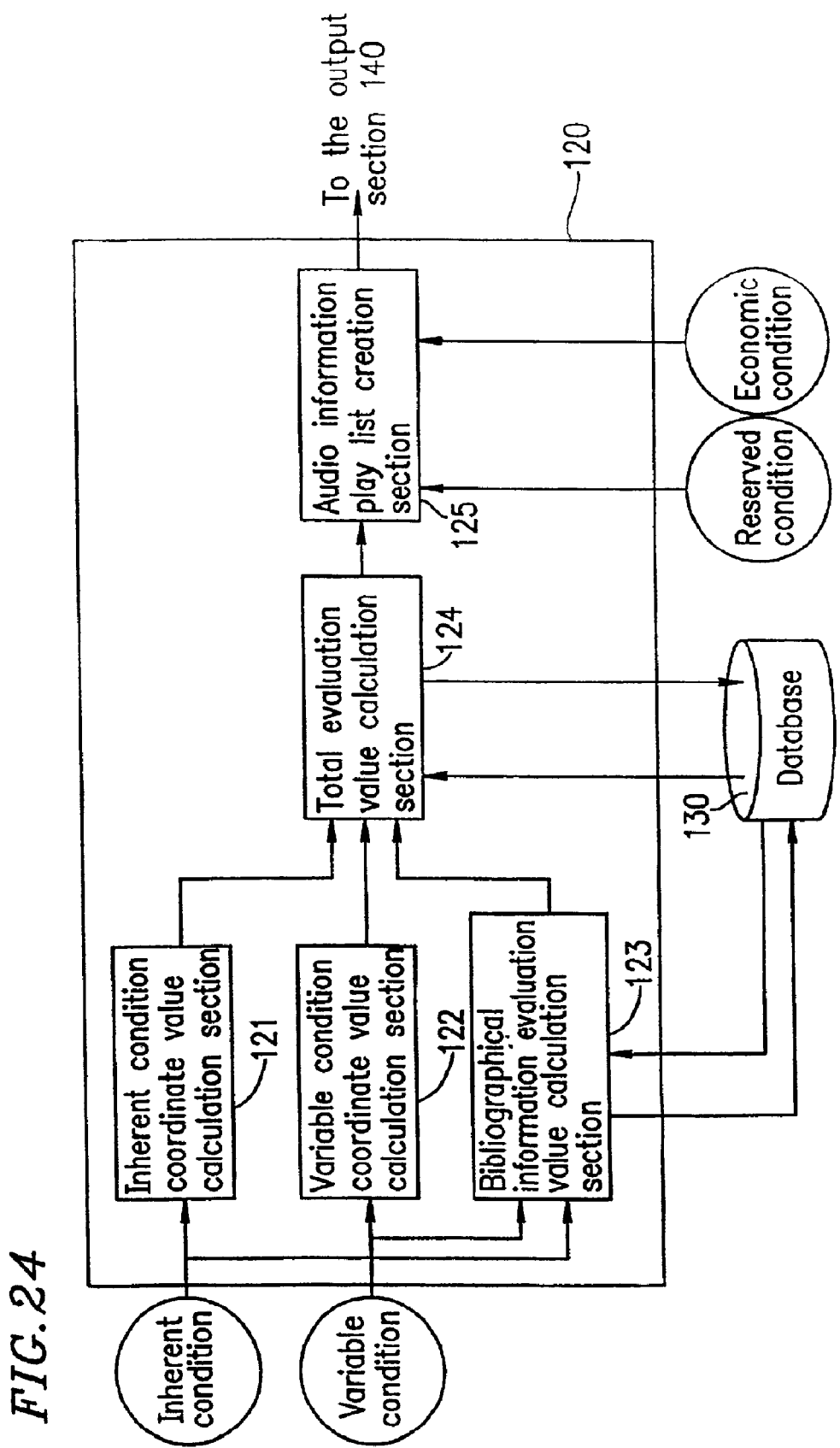
FIG. 24 shows a structure of a selection section of the audio information provision system according to the second example.

The audio information provision system 200 includes an economic condition input section 104 in addition to the elements of the audio information provision system 100 shown in FIG. 1. An economic condition input to the economic condition input section 104 represents a desired cost, for example, a budget of the audio information stream to be provided to the target. The economic condition which is input to the economic condition input section 104 is output to the audio information play list creation section 125 as shown in FIG. 24.

The audio information play list creation section 125 further selects audio information streams from the audio information streams selected by the total evaluation value calculation section 124 so that the cost is within the economic condition. From the further selected audio information streams and the audio information streams set based on the reserved condition, an audio information play list within the economic condition is created. For example, when an upper limit of 5000 yen is provided by the economic condition on the audio information play list created in units of one day, an audio information stream is created including upper level songs corresponding to the budget in the audio information play list selected by the total evaluation value calculation section 124 so that the total cost is within 5000 yen.

EXAMPLE 3

Figure 25:
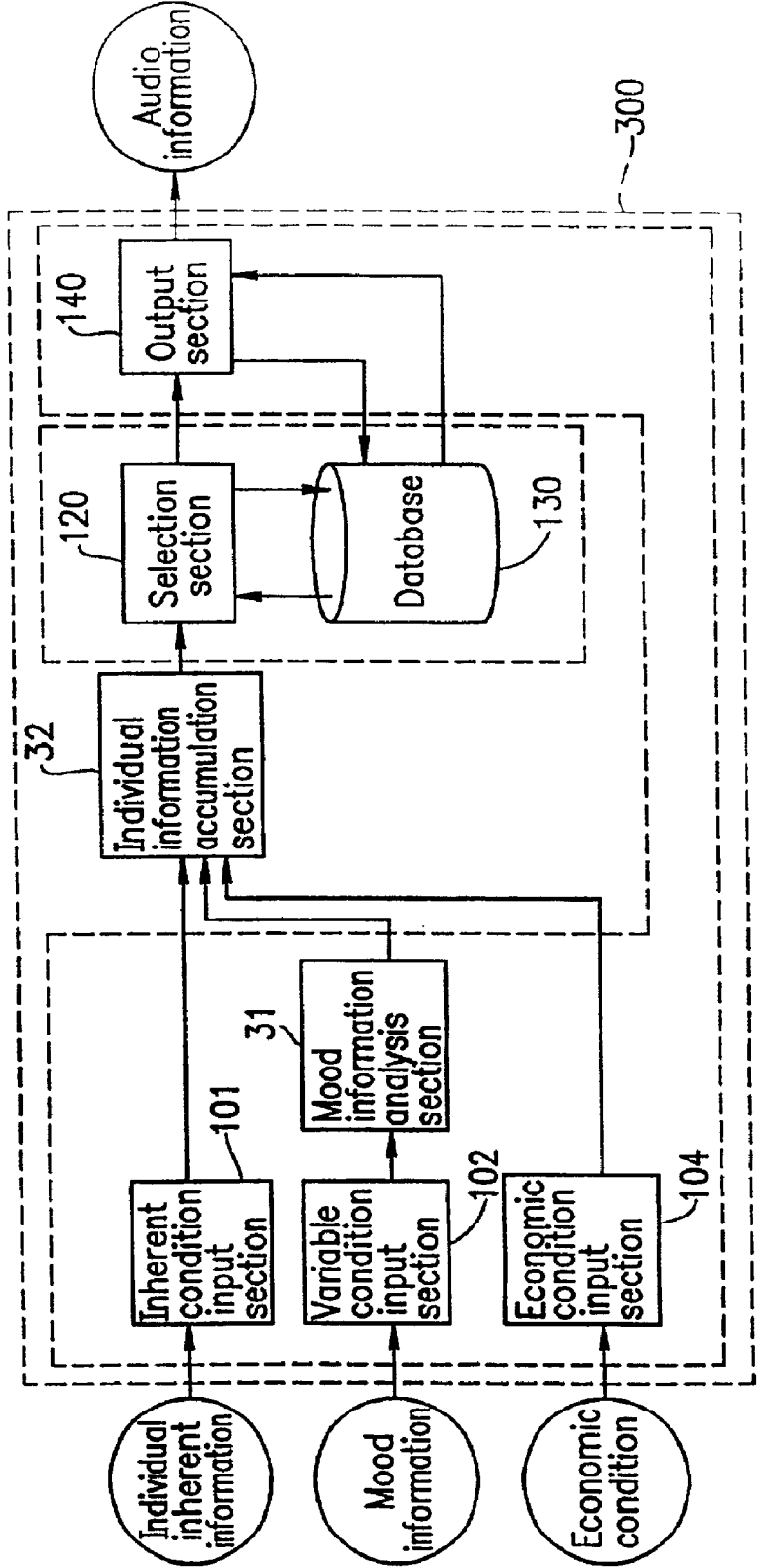
FIG. 25 shows an audio information provision system according to a third example of the present invention.

FIG. 25 shows an audio information provision system 300 according to a third example of the present invention. In the third example, the audio information provision system 300 provides an individual (or user) with audio information. The audio information provision system 300 includes an inherent condition input section 101 for receiving individual inherent information which is inherent to an individual as described further below, a variable condition input section 102 for receiving mood information which represents the mood of the individual, and an economic condition input section 104 for receiving a desired service cost desired by the individual. The audio information provision system 300 further includes a mood information analysis section 31 for analyzing the mood information which is output from the variable condition input section 102 and then outputting the analysis result, an individual information accumulation section 32 for accumulating the individual inherent information output from the inherent condition input section 101, the analysis result output from the mood information analysis section 32 and the desired service cost output from the economic condition input section 104, a database 130 for storing audio information streams, a selection section 120 for performing a search in the database 130 based on the individual inherent information, the analysis result, and the economic condition and thus providing an audio information stream which is suitable to the mood and the budget of the user, and an output section 140 for outputting the audio information stream selected by the selection section 120. The audio information for individuals is mainly music.

The individual information accumulation section 32 can be connected to the inherent condition input section 101, the mood information analysis section 31, and the economic condition input section 104 through a communication line. The selection section 120 can be connected to the individual information accumulation section 32 also through a communication line. The output section 140 can be connected to the selection section 120 through a communication line. Each communication line can be an arbitrary network, such as, for example, the Internet.

In the example shown in FIG. 25, the inherent condition input section 101, the variable condition input section 102, the economic condition input section 104, the mood information analysis section 31, and the output section 140 are included in the terminal 151 (FIG. 2).

The individual information accumulation section 32 can be set in a control center having an accounting processing function for counting the cost of the audio information streams provided to each user.

In the example shown in FIG. 25, the database 130 and the selection section 120 can be included in a content holder. The content holder manages a huge amount of audio information streams (contents) stored in the database 130.

"Individual inherent information" refers to data which is inherent to the user. Examples of the individual inherent information include the name, sex, date of birth, occupation, birthplace, family structure, musical experience, favorite music, and credit card number of the user.

"Mood information" refers to data which represents the feeling of the user. Examples of the mood information include (i) data which represents the state of the user himself/herself such as the feeling, emotion and psychological condition of the user, and (ii) data which represents the nature of music such as the mood, image and genre of the music that the user wants to listen to at a certain time. When the user does not know which genre of music that he/she wants to listen, it is not necessary to input the genre. It is preferable, though, to input the genre of the music that he/she wants to listen, in order to obtain music which is closer to the mood of the user.

A "desired service cost" refers to the cost that the user is ready to pay in exchange of the audio information provision service. The user can input any amount of money as the desired service cost in consideration of their budget. The user can determine the desired service cost in accordance with the duration, number of songs or quality of the music provided. Alternatively, the user can determine the desired service cost in consideration of the effect provided by the music in accordance with the suitability of the music to his/her mood. Still alternatively, the user can determine the desired service cost in consideration of the production cost of the music that the user assumes.

The input interface used by the user to input the mood information is preferably a user-friendly input interface which represents the image of the music desired by the user with words or colors.

The input interface can be a check box as shown in FIG. 26, in addition to the input interfaces 111 (input bar), 112 (map) and 113 shown in FIGS. 5A, 5B and 5C. FIG. 26 shows an input interface 116 which includes check boxes and allows the user to input detailed setting for individuals. The input interface 116 also allows the individual inherent information and the desired service cost to be input to the terminal. The input interface 116 is displayed on, for example, the screen of the display 155 of the terminal 151 (FIG. 2).

The input interface 116 including check boxes allows the user to input the mood information by selecting the words which represent the image of the music he/she desires. Such words are, for example, words representing the feelings such as "calm" or "cheerful and happy", words representing a location such as "southern" or "seaside", or words representing a color such as "red" or "blue".

Using the input interface 116 shown in FIG. 26, the user inputs the individual inherent information (for example, text data representing the name of the user) and clicks the check box of the desired type of music in the musical genre check list (for example, the check box of "bossa nova"). The user also clicks the check box or boxes of the words representing the image of the desired music (for example, the check boxes of "calm", "cheerful and happy" and "southern"), and inputs the desired service cost. In this manner, the individual inherent information is input to the inherent condition input section 101, the mood information is input to the variable condition input section 102, and the desired service cost is input to the economic condition input section 104. In this example, the musical genres that the user likes and does not like can be registered in advance as individual inherent information.

The individual inherent information and the desired service cost which have been input are accumulated in the individual information accumulation section 32 together with the credit card number or the like. The mood information which has been input is analyzed by the mood information analysis section 31. The analysis result is represented as values weighted by different coefficients for a plurality of different musical representation factors.

FIG. 27 shows an example of mood information input by the user and the analysis result provided by the mood information analysis section 31. In the example shown in FIG. 27, the mood information is data which represents the image of the music desired by the user. A "musical representation factor" refers to a factor used to represent the nature of the music (for example, a cheerfulness factor or a sadness factor). The nature of the music is represented by values f(1), f(2), ..., f(m) (where m is a total number of musical representation factors) weighted by different coefficients for a plurality of different musical representation factors.

In the following description, "values weighted by different coefficients for a plurality of different musical representation factors" will be referred to also as an "analysis result using musical representation factors".

The mood information is transformed into an analysis result using musical representation factors in compliance with a mood representation rule. The mood representation rule is defined, in advance, by a table which transforms an image of music into values of musical representation factors by a psychological technique such as the SD method or the multi-dimensional scaling.

The mood information analysis section 31 outputs the analysis result using musical representation factors to the individual information accumulation section 32.

The individual information accumulation section 32 accumulates the individual inherent information, the analysis result of the mood information and the desired service cost as described above, and also sends information representing a selection condition (i.e., the desired service cost and the analysis result using musical representation factors) to the selection section 120. The analysis result of the mood information and the desired service cost are accumulated in the individual information accumulation section 32 as at least a part of individual preference data which represents the taste of the user. The individual preference data is updated each time the analysis result of the mood information and the desired service cost are input.

The selection section 120 performs a search in the database 130 based on the desired service cost and the analysis result using musical representation factors.

The structure of the audio information streams stored in the database 130 is similar to that shown in FIG. 8.

Referring to FIG. 8, the related information streams INFO(1) through INFO(n) each include bibliographical information (title of the song, performer, musical genre, formation of instruments, or the like), the result of analysis of the audio information streams using musical representation factors (i.e., values g(1), g(2), ... g(m) (where m is a total number of musical representation factors) weighted by different coefficients for a plurality of different musical representation factors), and a basic provision cost.

The "basic provision cost" refers to a basic cost which is calculated based on copyright managing cost, production cost and the like.

The analysis results using musical representation factors included in the related information streams of the database 130 are obtained by analyzing the audio information streams in a method similar to the method used by the information analysis section 31.

The selection section 120 calculates a sum S of the absolute values of the differences between the analysis results using musical representation factors provided by the mood information analysis section 31 (i.e., the values f(1), f(2), ..., f(m) weighted by different coefficients for a plurality of different musical representation factors) and analysis results using musical representation factors included in the related information streams of the database 130 (i.e.,the values g(1), g(2), ..., g(m) weighted by different coefficients for a plurality of different musical representation factors) in accordance with expression (5).

The above-mentioned sum S will be referred to as a "difference S", hereinafter.

$$S=\Sigma|f(i)-g(i)|(i=1, 2, \ldots, m) \quad (5)$$

The selection section 120 outputs audio information streams corresponding to the related information streams, as the selection result. The audio information streams are output in the order starting from the audio information stream corresponding to the smallest difference S. As the selection result, a single audio information stream can be output, or a plurality of audio information streams can be output. The number of audio information streams which are output as the selection result is determined in a manner described below.

The selection section 120 adds an adaptation cost to the basic provision cost of each audio information stream. The "adaptation cost" is obtained by multiplying the basic provision cost by an adaptation ratio R. The adaptation ratio R increases as the difference S is smaller (i.e., the accuracy of the selection result with respect to the audio information stream demanded by the user is higher). It should be noted that the upper limit of the adaptation ratio R is specified. Alternatively, the upper limit of the adaptation ratio R can be automatically determined based on the number of audio information streams provided as the selection result, the basic provision cost, and the desired service cost within a range of, for example, ±10% (the margin can be freely determined by the music providing side, for example, the content holder).

The number of audio information streams which are output as the selection result is determined in accordance with the desired service cost. Audio information streams are output until the grand total of the total costs exceeds the desired service cost. The total cost of each audio information stream is the sum of the basic provision cost and the adaptation cost. In this manner, at least one audio information stream is output as the selection result. Even an identical song may cost differently to different individuals when the adaptation ratio is different.

Table 1 show an exemplary selection result provided by the selection section 120. In this example, the desired service cost is 500 yen, and the upper limit of the adaptation ratio R is 25%.

TABLE 1

| | Music file No. | Basic provision cost (yen) | Difference S | Adaptation ratio R (%) | Provision cost (yen) |
|---|---|---|---|---|---|
| 1. | #00011 | 100 | 0.11 | 25 | 125 |
| 2. | #03770 | 100 | 0.19 | 20 | 120 |
| 3. | #00462 | 200 | 0.25 | 15 | 230 |
| 4. | #09944 | 150 | 0.26 | 10 | 165 |

The total cost of three songs counted from the song corresponding to the smallest difference S is 475 yen, which is less than the desired service cost of 500 yen. The total cost of four songs counted from the smallest difference S is 640 yen, which exceeds the desired service cost of 500 yen. Therefore, the selection section 120 outputs the upper three songs (i.e., music file numbers #00011, #03770 and #00462).

Due to such a system, according to the audio information provision system 300, even an identical audio information streams is purchased at different costs by each individual.

The audio information stream output from the selection section 120 is provided to the user through the output section 140.

It is preferable to adopt a system of allowing the user to listen to the audio information stream for a prescribed time period (for example, 45 seconds) free of charge so that the user feeds back to the audio information provision system whether the user is satisfied with the provided audio information stream.

Figure 28:
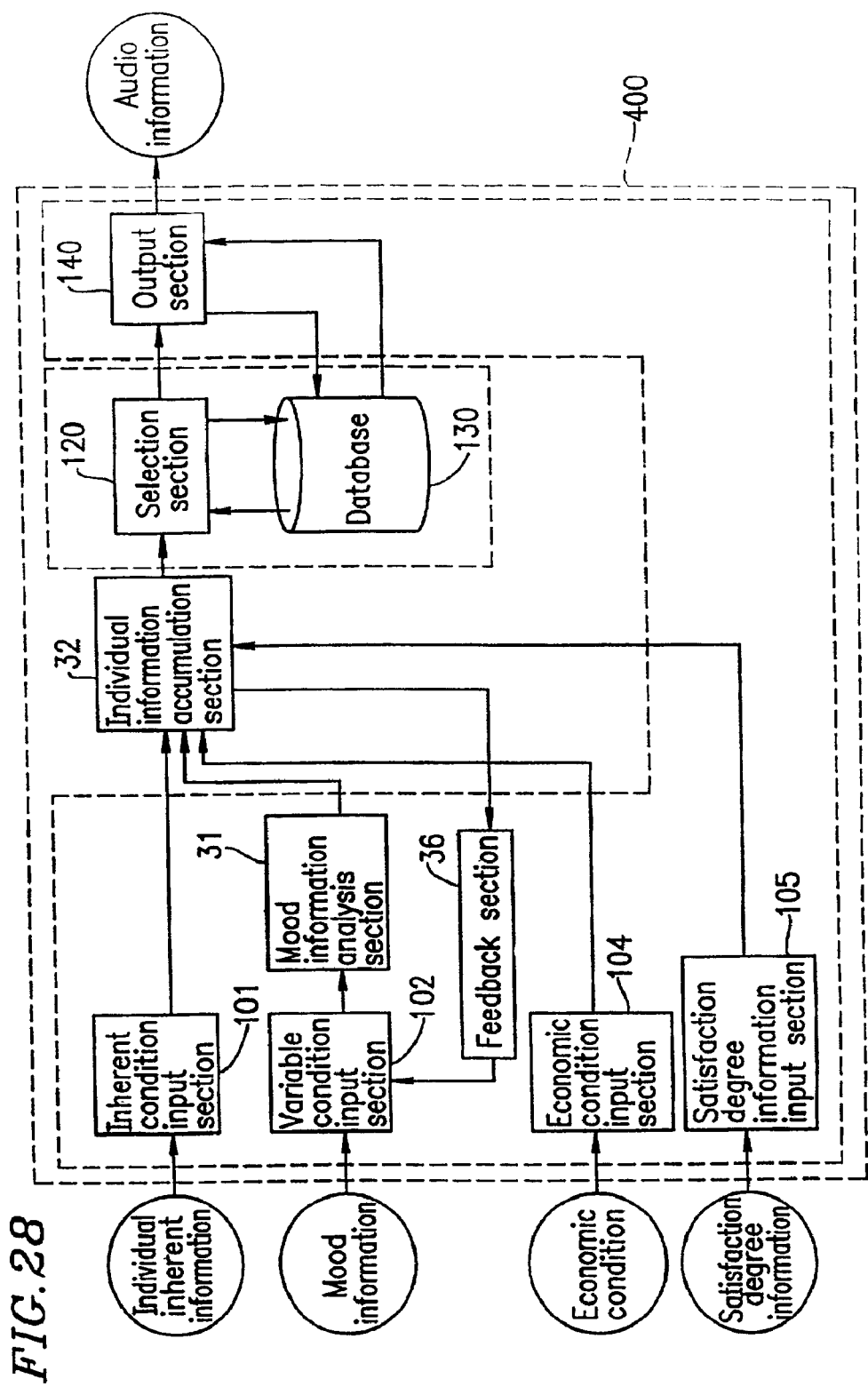
FIG. 28 shows another audio information provision section according to the third example of the present invention.

FIG. 28 shows an audio information provision system 400 having such a feedback function. In FIG. 28, identical elements as those described above with reference to FIG. 25 bear identical reference numerals therewith and detailed descriptions thereof will be omitted.

The audio information provision system 400 includes a satisfaction degree information input section 105 and a feedback section 36 in addition to the elements shown in FIG. 25.

The satisfaction degree information input section 105 is structured so that the user can input information indicating whether the user is satisfied with the provided audio information stream.

More specifically, the user can sample the provided audio information stream and then input satisfaction degree information, which indicates whether the user is satisfied with the provided audio information stream, to the satisfaction degree information input section 105. When the user inputs information indicating that "he/she is satisfied with the provided audio information stream" to the satisfaction degree information input section 105, such information is provided to the individual information accumulation section 32.

It is preferable that the individual information accumulation section 32 notifies the accounting section to bill the user only when it has received the information indicating that "the user is satisfied with the provided audio information stream". Thus, the user is not billed until the user is satisfied.

When the user inputs information indicating that "the user is not satisfied with the provided audio information stream" to the satisfaction degree information input section 105, such information is provided to the individual information accumulation section 32. In this case, it is preferable that the user also inputs the image he/she has on the audio information stream that he/she is not satisfied with, to the satisfaction degree information input section 105. Thus, the satisfaction degree of the user (or how much the provided audio information stream matches the mood of the user and the budget) can be fed back to the audio information provision system 400.

FIG. 29 shows an exemplary input interface 117 used to input, to the satisfaction degree information input section 105, (i) whether the provided audio information was sampled or not, (ii) whether the user was satisfied with the provided audio information stream, and (iii) the image the user has on the audio information stream that he/she was not satisfied with. The input interface 117 is displayed on, for example, the screen of a display of the terminal (not shown).

Using the input interface shown in FIG. 29, the user inputs the image he/she has on the audio information stream that he/she was not satisfied with, to the satisfaction degree information input section 105. In the example shown in FIG. 29, the images of the music are represented by the same words as those used in the input interface 116 shown in FIG. 26. These images of the music are transformed into values weighted by different coefficients for a plurality of different musical representation factors (analysis result using musical representation factors).

The analysis result using musical representation factors which has been input to the satisfaction degree information input section 105 is sent to the individual information accumulation section 32.

The individual information accumulation section 32 updates the analysis result using musical representation factors and also outputs the updated selection condition to the selection section 120. By updating the analysis result using musical representation factors accumulated in the individual information accumulation section 32, the precision of the analysis result using musical representation factors improves as the same user continues to use the audio information provision system 400 over time. As a result, the individual adaptability to that user is improved.

The selection section 120 performs another search in the database 130 based on the updated selection condition.

In this manner, the satisfaction degree of the user (or how much the provided audio information stream matches the mood of the user and the budget) can be fed back to the audio information provision system 400.

Returning to FIG. 28, the individual information accumulation section 32 accumulates the past selection results in addition to the individual inherent information, mood information, and the desired service cost.

The feedback section 36 refers to the past selection results accumulated in the individual information accumulation section 32 as individual preference data and notifies the individual preference data to the variable condition input section 102.

The variable condition input section 102 includes a plurality of input interfaces. The variable condition input section 102 is designed to provide the user with an input interface corresponding to the individual preference data notified by the feedback section 36 among the plurality of input interfaces.

FIG. 30 shows an exemplary input interface 118 used to input mood information to the variable condition input section 102. The input interface 118 show in FIG. 30 is displayed on, for example, the screen of a display of the terminal (not shown).

In the example shown in FIG. 30, it is assumed that an audio information stream in the musical genre of bossa nova was provided to the user in an immediately previous selection. The genre of the audio information stream provided to the user in the immediately previous selection can be found by referring to the past selection results accumulated in the individual information accumulation section 32.

The feedback section 36 refers to the past selection results accumulated in the individual information accumulation section 32, and controls the input interface in the variable condition input section 102 based on the past selection results. As a result, as shown in FIG. 30, check boxes for Latin music genres similar to bossa nova obtained in the immediately previous selection (for example, Afro-Cuban, salsa, rumba or the like) are added.

The variable condition input section 102 can have an input interface usable to input information representing musical elements (for example, rhythm, key, tempo, beat and the like). When the user has knowledge of music, the user can input mood information using the input interface representing the musical elements. Thus, mood information having a higher adaptability can be input.

Figure 31:
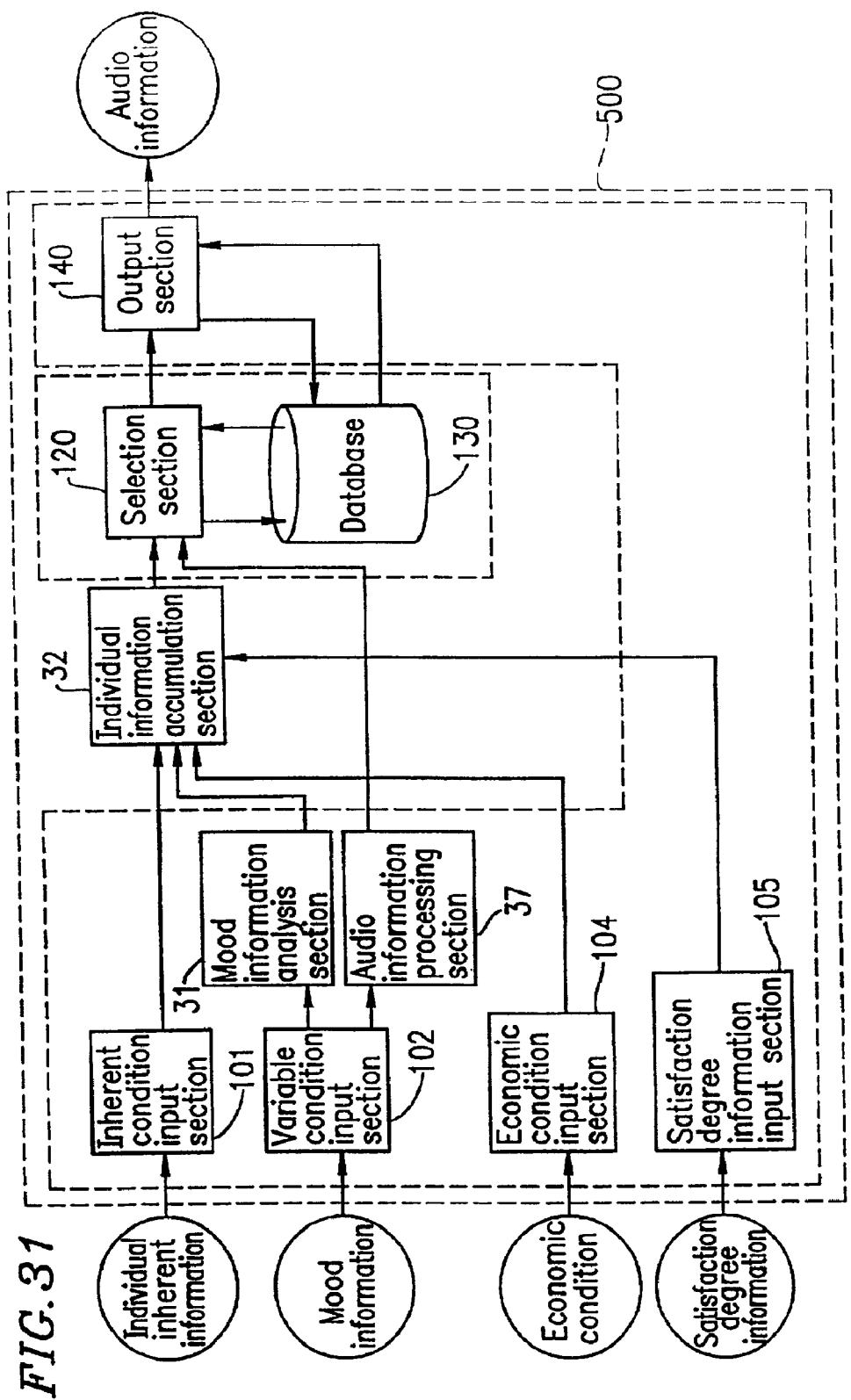
FIG. 31 shows still another audio information provision system according to the third example of the present invention.

FIG. 31 shows an audio information provision system 500. In FIG. 31, identical elements as those described above with reference to FIG. 25 bear identical reference numerals therewith and detailed descriptions thereof will be omitted.

The audio information provision system 500 includes an audio information processing section 37 in addition to the elements shown in FIG. 25.

The audio information processing section 37 transforms information representing musical elements (for example, rhythm, key, tempo, beat and the like) into a file format on the database 130 and sends the transformed information to the selection section 120. The selection section 120 selects and outputs audio information streams as described above.

EXAMPLE 4

Figure 32:
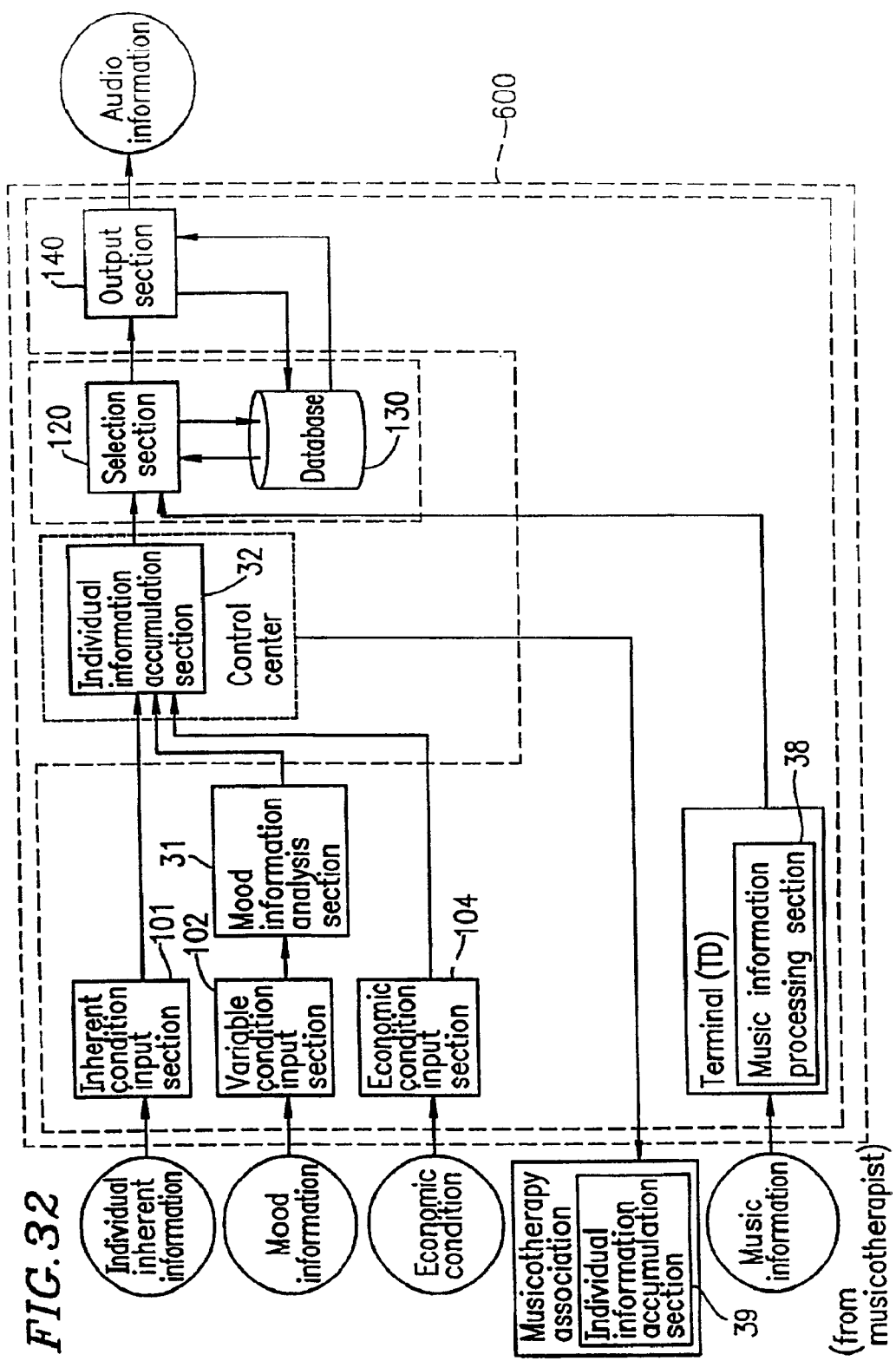
FIG. 32 shows an audio information provision system according to a fourth example of the present invention.

FIG. 32 shows an audio information provision system 600 according to a fourth example of the present invention. In FIG. 32, identical elements as those described above with reference to FIG. 25 bear identical reference numerals therewith and detailed descriptions thereof will be omitted.

When the user inputs individual inherent information, mood information and a desired service cost in the hope of obtaining specialized musicotherapy, the input data is sent to the individual information accumulation section 32 in the control center. The control center accumulates the input data in the individual information accumulation section 32 and, when necessary, sends the input data to an individual information accumulation section 39 in a musicotherapy association to which musicotherapists are registered. The data sent the musicotherapy association is accumulated in the individual information accumulation section 39. The individual information accumulation section 39 can be connected to the individual information accumulation section 32 through an arbitrary type of communication line.

In this case, the variable condition input section 102 provides the user with an input interface which is similar to a medical examination questionnaire in which the user is to describe his/her physical and mental states. The economic condition input section 104 provides the user with an input interface which allows the user to select a time period and a cost of one session.

FIG. 33 shows an input interface 119 provided by the variable condition input section 102 and the economic condition input section 104 when the user demands musicotherapy.

A musicotherapist analyzes the data accumulated in the individual information accumulation section 39 based on expert knowledge and inputs the analysis result (for example, data which indicates what type of music is suitable) to a music information processing section 38. The music information processing section 38 is included in, for example, the terminal 151 (FIG. 2). The musicotherapist generally has knowledge that, for example, "the first movement of Mozart's Symfonia Concertante is effective to an insomniac". Therefore, the musicotherapist inputs instruction information that "look for Mozart's Symfonia Concertante and songs similar thereto" to the music information processing section 38 in order to provide the insomniac with a suitable audio information stream.

The music information processing section 38 performs acoustic signal analysis such as frequency spectrum analysis, Wigner analysis, autocorrelation analysis or the like of the designated song, and thus extracts musical physical features such as the tempo, pitch, loudness, envelope, sound features and the like. Then, the music information processing section 38 sends these musical physical features as an instruction information processing result to the selection section 120. The selection section 120 can be connected to the music information processing section 38 through an arbitrary type of communication line.

Based on the instruction information processing result, the selection section 120 performs a search in the database 130. The selection section 120 selects and outputs audio information streams as described above.

Such a service can select and provide audio information streams which are suitable to various states and various types of mood of the user at a cost desired by the user.

In the information communication society of today, an enormous number of people have physical and mental stress. The audio information provision system 600 in the fourth example can select and provide music which is suitable to each feeling or each physical and mental state so as to encourage and heal these people. Especially, songs for musicotherapy have conventionally been selected based on knowledge from psychiatric counselors and therapists. According to the audio information provision system 600 of the present invention, a great number of songs suitable to the physical and mental states of patients can be easily selected and provided in a short time period.

EXAMPLE 5

Figure 34:
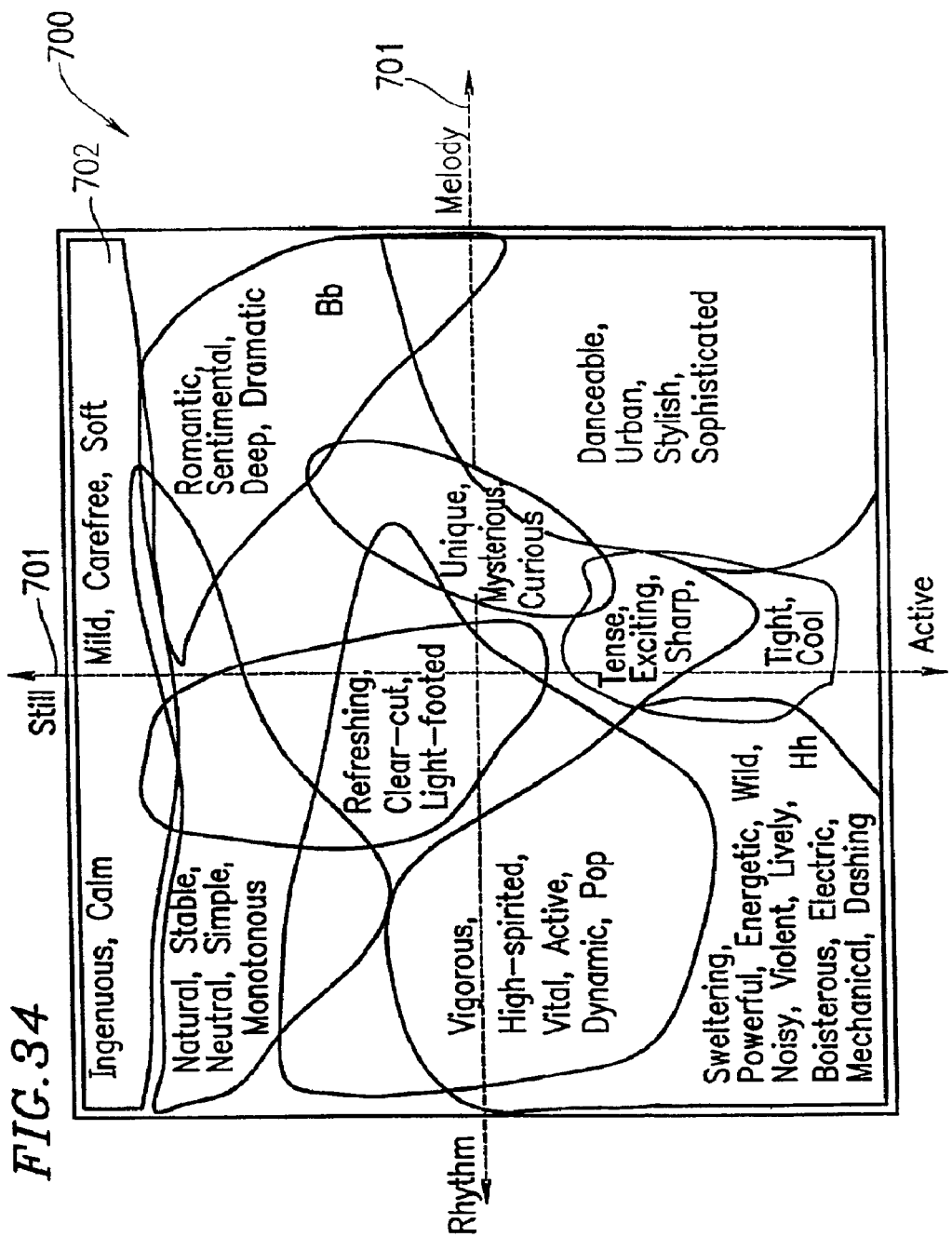
FIG. 34 shows a coordinate system representing a music image chart according to a fifth example of the present invention.

FIG. 34 shows a coordinate system 700 which is a music image chart in a fifth example of the present invention. The coordinate system 700 is provided to the user as an input interface provided by the variable condition input section 102 of the above-described examples. The coordinate system 700 is displayed on, for example, the screen of the display 155 (FIG. 2). The coordinate system 700 represents an impression space used for locating images of each individual audio information stream belonging to pop and popular music genres on a two-dimensional coordinate system. Coordinate axes 701 are representative factor axes for the pop and popular music genres. The vertical axis is a still-active axis, and the horizontal axis is a rhythm-melody axis. Reference numeral 702 represents image parts which indicate how images of the pop and popular music are classified. When an individual specifies at least one point in the coordinate system 700, impression information representing the impression of an audio information stream is input to the variable condition input section 102.

Each image part includes the following adjectives (A) through (I) which are used by the sampler of an audio information stream for representing images of the music.

(A) Adjectives representing calmness: calm, mild, carefree, ingenuous, soft (B) Adjectives representing degree of sentimentality: romantic, sentimental, deep, dramatic (C) Adjectives representing naturalness: natural, stable, neutral, monotonous, simple (D) Adjectives representing light-footedness: light-footed, refreshing, clear-cut (E) Adjectives representing curiousness: mysterious, unique, curious (F) Adjectives representing dynamicalness: vigorous, high-spirited, dynamic, vital, active, pop (G) Adjectives representing tenseness: sharp, tense, exciting, cool, tight (H) Adjectives representing intensiveness: violent, sweltering, powerful, energetic, wild, noisy, lively, boisterous, electric, mechanical, dashing (I) Adjectives representing sophistication: danceable, urban, stylish, sophisticated The images of each audio information stream are associated with musical features such as the tempo, frequency characteristics, formation of instruments, pitch, fluctuation of tempo, and the like. Therefore, all the genres of pop and popular music are mapped on the music image chart by the classification by the musical features and the classification of the image.

The coordinate system is created and mapping is performed in basically the same process as that described in the first example. Hereinafter, a process for creating the coordinate system and the performing of mapping will be described.

The adjectives representing images of music, the image parts and the representative factor axis are determined using the following psychological techniques. First, a psychological technique referred to as the sound source description selection method is used. The sound source description selection method selects representative adjectives, representing audio information streams, from language data which unspecified people associate to images perceived when actually sampling the audio information streams. Consideration of frequency of use of the adjectives and semantic associations of the adjectives with the images is included in the sound source description selection method. Then, a psychological technique such as the SD method or the like is used to perform multiple-stage evaluation of the images of the audio information streams. As the multiple-stage evaluation, five-stage or seven-stage evaluation is typically used. From the result of the multiple-stage evaluation, psychological feature of each audio information stream is obtained. Representative factors are determined by factor analysis such as principal component analysis or the like. Representative factors are selected from the representative adjectives so that the total of the evaluated suitability degree of each adjective is equal to or greater than 75%. When two factors amount to less than 75%, three factors are used as representative factors. On the two-dimensional plan having the representative factor axes as X and Y axes, the psychological feature is mapped. Thus, the image chart is created. FIG. 35 shows classification of adjectives which are described highly frequently regarding pop and popular music.

FIG. 36 shows the relationship between the musical features of audio information streams and image parts. In the case of audio information stream 1, the tempo is 140, the amplitude is large in a low frequency range and a high frequency range, the average pitch is 2500 Hz, and the fluctuation of the tempo is $1/f^2$. In this case, the image part is Hh. In the case of audio information stream 2, the tempo is 70, the amplitude gradually decreases as the frequency increases, the average pitch is 800 Hz, and the fluctuation of tempo is $1/f$. In this case, the image part is Bb. Such classification of the image part can be made by an expert familiar with music or by automatic processing. Once all the genres of pop and popular music are mapped on the music image chart, the music image chart can be used as an input interface for searching for audio information streams providing a certain image or for selecting songs. Thus, songs having a particular image associated to the user can be more likely and intuitively retrieved or selected.

The music image chart can be used in order to present search results or song selection results.

Figure 37:
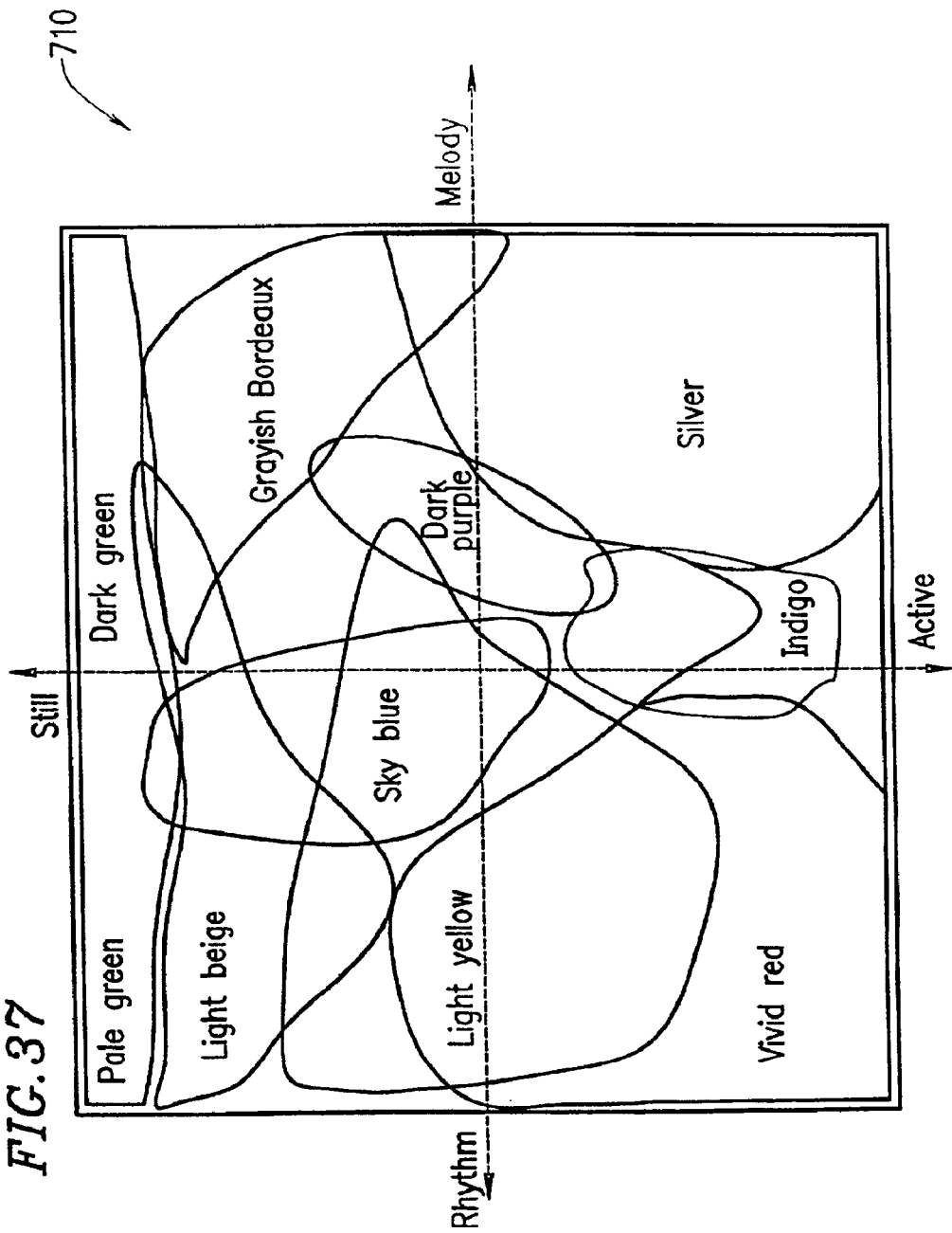
FIG. 37 shows another coordinate system representing a music image chart according to the fifth example.

FIG. 37 shows a coordinate system 710 which is an exemplary modification of the coordinate system 700. In the coordinate system 710 shown in FIG. 37, colors associated with words are used for the image parts.

Figure 38:
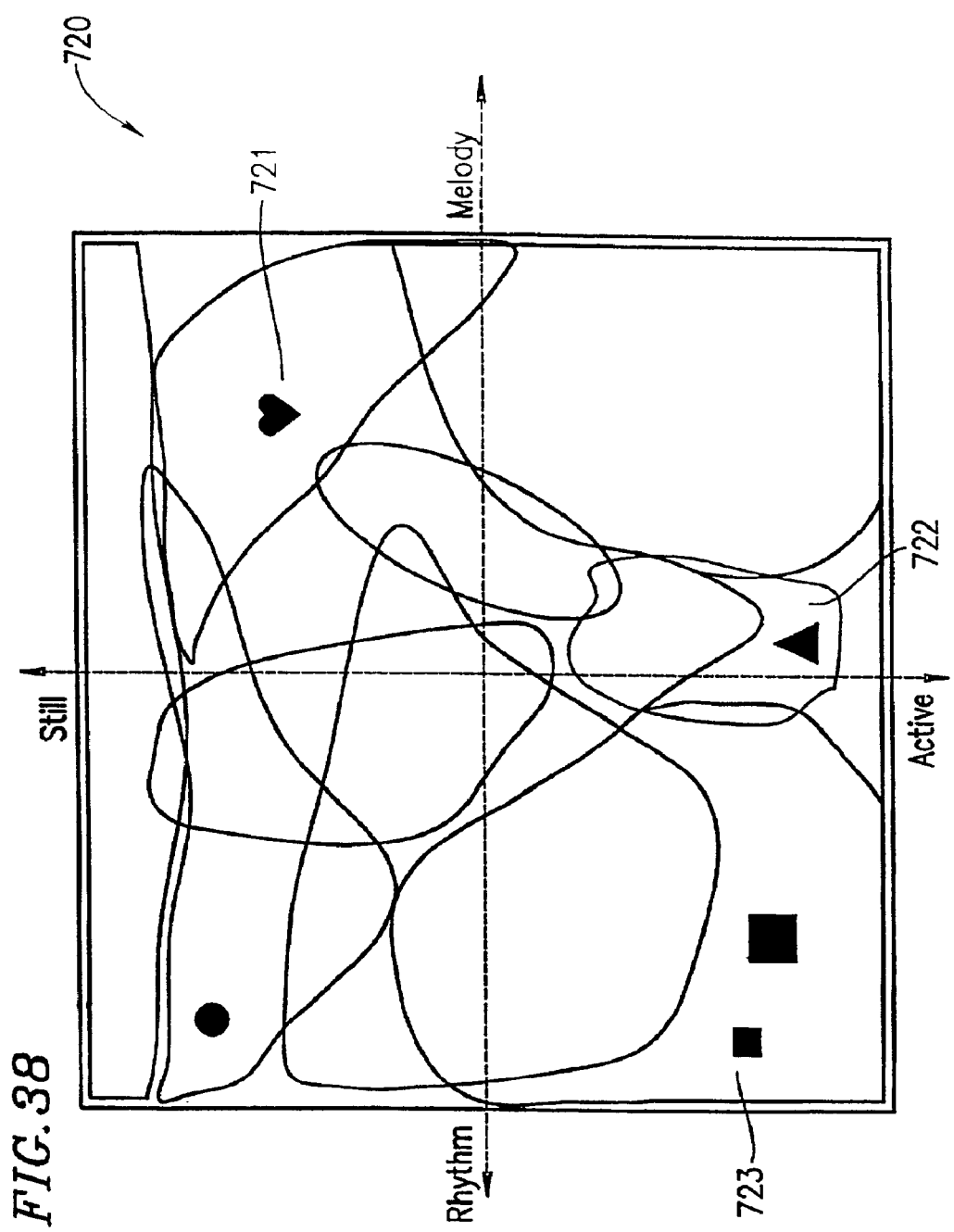
FIG. 38 shows still another coordinate system representing a music image chart according to the fifth example.

FIG. 38 shows a coordinate system 720 which is an exemplary modification of the coordinate system 710 shown in FIG. 37. In the coordinate system 720 shown in FIG. 38, the shapes and colors of coordinate points representing audio information streams mapped on the image parts can be altered in accordance with the image. For example, the coordinate point representing the audio information stream on an image part 721 representing the degree of sentimentality can be a heart-shaped symbol and pink. The coordinate point representing the audio information stream on an image part 722 representing the tenseness can be a triangular symbol and black. Alternatively, the size of a coordinate point can be changed in accordance with the strength of the image. On the same image part, a coordinate point representing an audio information stream giving a stronger image can be larger (see, for example, an image part 723). Thus, the user can intuitively associate an audio information stream with an image.

FIG. 39 shows a coordinate system 730 which is another exemplary modification of the coordinate system 700 shown in FIG. 34. The coordinate system 730 shows an exemplary image chart created for classical music. The shapes and sizes of the image parts and the adjectives representing the images of the music are changed to be suitable to classical music from those used in the coordinate system 700 for pop and popular music. By using the adjectives representing images of the music which are more suitable to the type of audio information streams desired by each individual, an image of the audio information streams desired by the individual is more easily obtained.

According to the present invention, an audio information stream is selected from a plurality of audio information streams based on the inherent condition of the target to which an audio information stream is to be provided and the variable condition which changes in accordance with time. Thus, an audio information stream fulfilling both of the inherent condition and the variable condition can be provided.

According to the present invention, music which is suitable to the objective, image, change in accordance with time and change in accordance with environment of commercial spaces, public spaces and private spaces where people can enjoy themselves can be selected by a simple method in a short time period. Thus, the cost which is conventionally quite high by reliance on specialists can be reduced, and music suitable to each listener can be provided from a wide variety of selections.

According to the present invention, use of a music image chart as an input interface provided by the variable condition input section allows the user to intuitively retrieve and select audio information streams which are best suited to his/her mood.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An audio information provision system for providing a target with an audio information stream suitable to the target, comprising:

a database for storing a plurality of audio information streams;

an inherent condition input section for receiving an inherent condition of the target;

a variable condition input section for receiving a variable condition varying in accordance with time in an external environment;

a selection section for selecting at least one audio information stream from the plurality of audio information streams based on at least the inherent condition and the variable condition; and an output section for outputting the at least one audio information stream.

2. An audio information provision system according to claim 1, wherein:

the database stores a plurality of related information streams respectively related to the plurality of audio information streams, each of the related information streams has a coordinate value representing a position of the corresponding audio information stream in a prescribed coordinate system which defines an impression of audio information streams, the selection section determines a coordinate value representing a position of the target in the prescribed coordinate system based on the inherent condition and the variable condition, and selects at least one audio information stream corresponding to at least one related information stream having a coordinate value which is located within a prescribed range from the coordinate value representing the position of the target.

3. An audio information provision system according to claim 2, wherein:

at least one related information stream among the plurality of related information streams includes at least one adjustment information stream which indicates that a distance between a coordinate value included in the at least one related information stream and the coordinate value of the target is adjusted, based on at least one of the inherent condition and the variable condition, and the selection section changes the coordinate value included in the at least one related information stream.

4. An audio information provision system according to claim 2, wherein the plurality of related information streams further include a plurality of physical feature information streams each representing a physical feature of the corresponding audio information stream of the plurality of audio information streams and a plurality of bibliographical information streams each representing a bibliography of the corresponding audio information stream of the plurality of audio information streams.

5. An audio information provision system according to claim 1, further comprising a reserved condition input section for receiving a reserved condition indicating that a preset audio information stream is output by the output section at a preset time, wherein the output section outputs the preset audio information stream at the preset time.

6. An audio information provision system according to claim 1, further comprising an economic condition input section for receiving an economic condition representing a desired cost for the at least one audio information stream, wherein the selection section selects at least one audio information stream, based on the economic condition, from among the at least one audio information stream selected from the plurality of audio information streams based on the inherent condition and the variable condition.

7. An audio information provision system according to claim 1, wherein the selection section is connected to the inherent condition input section, the variable condition input section and the output section via a communication line.

8. An audio information provision system according to claim 1, wherein the target is one of a commercial space and a public space.

9. An audio information provision system according to claim 1, wherein:

the target is an individual, the inherent condition represents inherent information of the individual, and the variable condition represents mood information of the individual.

10. An audio information provision system according to claim 9, further comprising:

an economic condition input section for receiving an economic condition representing a desired cost for the at least one audio information stream;

a mood information analysis section for analyzing the mood information and outputting a mood information analysis result; and an individual information accumulation section for accumulating the inherent information, the mood information analysis result and the economic condition, wherein the selection section selects at least one audio information stream, based on the economic condition, from among the at least one audio information stream selected from the plurality of audio information streams based on the inherent information and the mood information analysis result.

11. An audio information provision system according to claim 10, wherein:

the mood information analysis result and the economic condition are accumulated in the individual information accumulation section as individual preference information representing an individual preference, and the individual preference information is updated each time the mood information analysis result and the economic condition are input to the individual information accumulation section.

12. An audio information provision system according to claim 9, further comprising a satisfaction degree information input section for receiving satisfaction degree information representing a satisfaction degree of the individual for the at least one audio information stream.

13. An audio information provision system according to claim 10, wherein:

the individual information accumulation section accumulates a past selection result provided by the selection section, the audio information provision system further comprises a feedback section for presenting to variable condition input section, as individual preference information representing an individual preference, the past selection result accumulated in the individual information accumulation section, and the variable condition input section provides the individual with an input interface based on the individual preference information.

14. An audio information provision system according to claim 9, further comprising:

an economic condition input section for receiving an economic condition representing a desired cost for the at least one audio information stream;

a mood information analysis section for analyzing the mood information and outputting a mood information analysis result; and an individual information accumulation section for accumulating the inherent information, the mood information analysis result and the economic condition, wherein the selection section selects at least one audio information stream from the plurality of audio information streams based on instruction information from a musicotherapist based on the inherent information, the mood information analysis result and the economic condition.

15. An audio information provision system according to claim 9, wherein the variable condition input section inputs impression information representing an impression of an audio information stream desired by the individual as the mood information.

16. An audio information provision system according to claim 15, wherein:

the variable condition input section includes a display section, the variable condition input section provides the individual with a prescribed coordinate system which defines an impression of audio information streams through the display section, and the impression information is input to the variable condition input section by the individual specifying at least one point in the prescribed coordinate system.

17. An audio information provision system according to claim 16, wherein:

the prescribed coordinate system includes a plurality of words representing the impression, and the plurality of words are changed in accordance with the type of audio information stream desired by the individual.

18. An audio information provision system according to claim 16, wherein the prescribed coordinate system has a plurality of image parts.

19. An audio information provision system according to claim 16, wherein the impression is represented by at least one of a word, a color and a symbol.

* * * * *